United States Patent Office 3,726,635
Patented Apr. 10, 1973

3,726,635
PROCESS FOR DYEING HUMAN HAIR WITH NITROPARAPHENYLENEDIAMINE DYESTUFF AND COMPOSITIONS THEREFOR
Gregoire Kalopissis, Paris, and Andree Bugaut, Boulogne-sur-Seine, France, assignors to L'Oreal, Paris, France
No Drawing. Continuation of application Ser. No. 568,118, July 27, 1966. This application Dec. 2, 1970, Ser. No. 94,631
Int. Cl. A61k 7/12; D06p 3/04
U.S. Cl. 8—10                9 Claims

ABSTRACT OF THE DISCLOSURE

Hair dye compositions which contain 1-amino-4-amino alkyl amino-nitro-benzene dyes are usefully employed in a process for dyeing hair.

---

This application is a continuation of application Ser. No. 568,118, filed July 27, 1966, now abandoned.

The use of nitroparaphenylediamine and its substitution products as products entering into the composition of tinctorial solutions for hair or other keratinic fibers is well-known. The object of the present invention is to propose new products of this same category which will improve the results obtained in the dyeing of hair.

The object of the present invention is to provide, as a new article of manufacture, a tinctorial composition for keratinic fibers and especially for hair, this composition being essentially characterized by the fact that it consists of an aqueous solution of one or more dyes having the following formula:

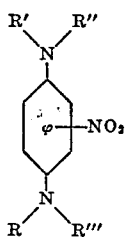

(I)

in which R, R' and R" represent a hydrogen atom, a lower alkyl radical or a lower hydroxyalkyl radical and in which R''' is a radical which may be quaternized on the nitrogen at the end of the chain when this nitrogen is tertiary, a radical having the formula :

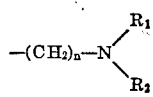

in which $R_1$ and $R_2$ may be the same or different and represent a hydrogen atom, a lower alkyl radical or a lower hydroxyalkyl radical, and $R_1$ and $R_2$ may also form a heterocycle with the nitrogen atom upon which they are fixed, while the parameter $n$ is an integer between 2 and 6 inclusive. The amino group situated in the ortho position to the nitro group in Formula I is never tertiary and radicals R' and R" may not simultaneously represent hydrogen.

Another object of the present invention is to produce the new article of manufacture which consists of a dye having the formula:

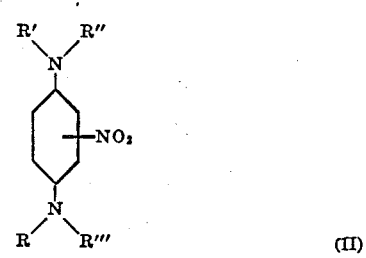

(II)

in which R, R', R" and R''' have the above-cited definitions, the amino group which is situated in the ortho position to the nitro group in Formula II never being tertiary and the radicals R' and R" not simultaneously representing hydrogen.

Dyes having Formula I have the advantage of having, when cold, a great affinity for keratinic fibers. Hair dyes made from these dyes can result in very strong shades and the two characteristics cited above, namely the strength of the coloration and the affinity for keratinic fibers, permit the dyes to be used, even in very small quantities, in tinctorial solutions. This peculiarity is very valuable because it makes the use of dyes having a relatively poor solubility possible and satisfactory.

It should also be noted that dyes according to the present invention have a particularly valuable resistance to light and to washing. Moreover, they may be used in a pH range which is much wider than the presently-known range of usage for analogous types of dyes. They may in fact be used from pH 4 to pH 10. The preferable range of usage is between pH 6 and pH 10.

Dyes according to the present invention also have the peculiarity of having as a substituent of one of the amino groups fixed on the benzene ring, a chain which has a terminal amino group which is quaternizable when said terminal amino group is tertiary. The quaternaries thus obtained may also be used as hair dyes in the same way as the corresponding tertiary compounds.

Tinctorial compositions according to the invention do not require the addition of peroxides such as hydrogen peroxide as other hair dyes do in order to develop the color.

However, different ingredients commonly used in hair-dyeing treatments may be added to these tinctorial compositions, such as organic solvents, thickeners, detergents and lacs, for example.

The time during which the aforementioned tinctorial solutions are in contact with the hair may vary within wide limits, but preferably it should be between 5 and 30 minutes.

The temperature at which the tinctorial solutions are applied may also be varied, but in most cases they may be advantageously used at ordinary temperatures.

With dyes of the type conforming to the invention, it is possible to notably vary the concentration of tinctorial solutions based on such dyes, but the preferable concentration is between 0.1% and 3.5%.

It should be noted that any of the dyes of Formula I may be mixed with any other dye according to the invention or with any other nitrated dyes, as, for example, nitroorthophenylenediamine, nitroparaphenylenediamine and alkyl or hydroxyalkyl derivatives of these compounds. The new dyes according to the invention may also be mixed, according to the object sought, with azo or anthraquinone dyes or other types of dyes usually used for hair-dyeing.

EXAMPLE 1

First method of preparing 1-N-methylamino-2-nitro-4-N'-(β-diethylamino) ethylamino benzene

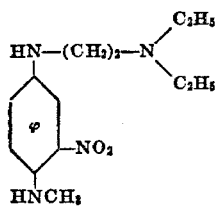

A mixture containing 0.25 mols (41.7 g.) of 1-N-methylamino-2-nitro-4-amino benzene, 250 cm.³ of water and 14 g. of calcium carbonate is brought to reflux. 0.28 mol (47.5 g.) of diethylamino-ethylchloride hydrochloride, in solution in 250 cm.³ of water, is introduced little by little, while stirring. After keeping the mixture at reflux for three hours, it is boiled dry, cooled, and filtered, and alkalized with sodium hydroxide. The resulting product is extracted, using ethyl acetate. The ethyl acetate solution is washed with water, dried with sodium sulfate, and filtered. The product is cooled, treated with gaseous hydrochloric acid, and, on drying, yields 72 g. of 1-N-methylamino-2-nitro-4-N'-(β-diethylamino)-ethylamino benzene dihydrochloride containing a little hydrochloride of the starting product. After purification in hydrochloric propanol, the dihydrochloride melts and decomposes at 125° C. The base, when isolated in the conventional manner from this dihydrochloride, is an oil having the following analysis:

*Analysis.*—Calculated for $C_{13}H_{22}N_4O_2$ (percent): C, 58.64; H, 8.27; N, 21.05. Found (percent): C, 58.36–58.33; H, 8.42–8.39; N, 21.29–21.12.

EXAMPLE 2

Second method of preparing 1-N-methylamino-2-nitro-4-N'-(β-diethylamino)ethylamino benzene First step: Preparation of 1-N-methylamino-2-nitro-4-[N' - (β - diethylamino)ethyl-N'-benzenesulfonyl]amino benzene.

0.575 mol of diethylaminoethylchloride hydrochloride in solution in 150 cm.³ of water and 150 cm.³ of 2 N sodium hydroxide is added little by little, at about 80° C., to a solution of 0.326 mol (100 g.) of 1-methyl-amino-2-nitro-4-N'-benzenesulfonylamino benzene in 350 cm.³ of normal sodium hydroxide. The reaction mixture is held at 80° C. for three hours. After cooling, drying yields 130 g. of 1-N-methylamino-2-nitro-4-[N'-(β-diethylamino)ethyl - N' - benzene-sulfonyl]amino benzene. The crude product is washed in normal sodium hydroxide and then with water, to eliminate any traces of the starting product. After recrystallization in alcohol, the end product melts at 112° C.

*Analysis.*—Calculated for $C_{19}H_{26}N_4O_4S$ (percent): C, 56.15; H, 6.40; N, 13.79. Found: (percent): C, 55.90–55.98; H, 6.25–6.32; N, 13.99–14.07.

Second step: Preparation of 1-N-methylamino-2-nitro-4-[N' - (β - diethylamino)ethyl]amino benzene dihydrochloride.

0.148 mol (60 g.) of 1-N-methylamino-2-nitro-4-N'-benzene-sulfonyl-N'-β-(diethylamino)-ethylamino benzene is added little by little, while stirring, to 200 cm.³ of concentrated sulfuric acid, while keeping the temperature at 10° C. The reaction mixture is left for 6 hours at this temperature, and then poured over 1.5 kg. of cracked ice. After alkalizing the product with 10 N sodium hydroxide, it is extracted with ethyl acetate. The ethyl acetate solution is washed with water, dried on sodium sulfate, and filtered.

The cooled ethyl acetate solution is saturated with gaseous hydrochloric acid and drying yields 48 g. of the dihydrochloride of 1-N-methylamino-2-nitro-4-N'-β-(diethylamino)ethylamino benzene.

The base is then isolated from this dihydrochloride in a conventional manner. The product obtained by this method is purer than that obtained as in Example 1.

EXAMPLE 3

Preparation of 1-N-methylamino-2-nitro-4-N'-β-(methylhydroxyethyl)-aminoethylamino benzene

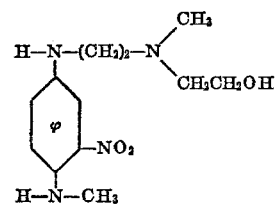

First step: Preparation of 1-N-methylamino-2-nitro-4-N'-β-chloroethylamino benzene.

20 cm.³ of thionyl chloride is added, little by little, while cooling and stirring, to a solution containing 0.118 mol (25 g.) of 1-N-methylamino-2-nitro-4-N'-β-hydroxyethylamino benzene in 300 cm.³ of 1,2-dichloro-ethane. After the addition has been completed, the reaction mixture is held at room temperature for two hours and then at 60° C. for one hour. After cooling, drying yields 28 g. of 1-N-methylamino-2-nitro-4-β-chloroethylamino benzene in the form of the hydrochloride. In order to purify this crude product it is dissolved in normal hydrochloric acid at reflux and the reflux is continued several minutes in the presence of animal black, after which it is filtered while boiling.

After cooling the filtrate, it is saturated with gaseous hydrochloric acid. The filtrate is then kept iced over night, and on drying yields 23 g. of 1-N-methylamino-2-nitro-4-N'-β-chloroethylamino benzene hydrochloride, which is practically pure. The base is liberated from the hydrochloride by conventional alkalization. After recrystallization in a benzene-hexane mixture, this product melts at 93° C. The analysis of the end product is:

*Analysis.*—Calculated for $C_9H_{12}N_3O_2Cl$ (percent): C, 47.05; H, 5.22; N, 18.30. Found: (percent): C, 46.86–46.96; H, 5.08–5.16; N, 18.12–18.05.

Both the chlorinated compound obtained in this manner and the analogous chlorinated compounds hereinafter described, are suitable for use in hair dyes.

Second step: Action of an amine on the product obtained in the first step.

A mixture of 0.0349 mol (8 g.) of 1-N-methylamino-2-nitro-4-N'-β-chloroethylamino benzene and 0.2792 mol (20.9 g.) of methyl-β-hydroxyethylamine is heated for 8 hours at between 120 and 130° C. The excess of methyl-β-hydroxyethylamine is driven off under vacuum. The oily residue is dissolved in benzene and the benzenic solution washed in water, dried on sodium sulfate, and filtered. After driving off the benzene under vacuum, the yield is 7 g. of 1 - N - methylamino-2-nitro-4-N'-β(methyl-hydroxyethyl)amino-ethylamino benzene, which is practically pure. This oil is dissolved in 100 cm.³ of propanol, cooled in ice and saturated with dry gaseous hydrochloric acid. Drying yields 8.1 g. of the end product in the form of the dihydrochloride, which melts and decomposes between 137 and 142° C. The oily base is regenerated from this dihydrochloride in the conventional manner, by alkalizing it. The analysis of the final product is:

*Analysis.*—Calculated for $C_{13}H_{20}N_4O_3$ (percent): C, 53.73; H, 7.46; N, 20.89. Found (percent): C, 53.95–53.75; H, 7.60–7.50; N, 20.98–20.75.

EXAMPLE 4

Preparation of 1-methylamino-2-nitro-4-(N'-β-hydroxyethyl-N'-β-diethylaminoethyl)amino benzene

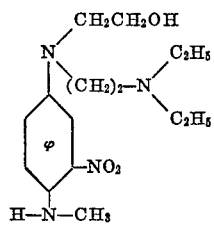

A mixture of 0.237 mol (50 g.) of 1-N-methylamino-2-nitro-4-N'-β-hydroxyethylamino benzene, 200 cm.³ of water, and 20 g. of calcium carbonate is brought to reflux. 0.355 mol (61 g.) of β-diethylamino-ethylchloride hydrochloride in solution in 120 cm.³ of water is added, little by little, while stirring.

After having maintained the reflux for three hours, the mixture is filtered hot, and the filtrate cooled and alkalized with sodium hydroxide. The product is then extracted with ethyl acetate, the ethyl acetate solution is washed with water, dried with sodium sulfate, and filtered. This chilled solution is saturated with dry gaseous hydrochloric acid and drying yields 65.5 g. of 1-N-methylamino-2-nitro - 4 - (N' - β-hydroxyethyl-N'-β-diethylaminoethyl) amino benzene dihydrochloride which, after recrystallization in hydrochloric propanol melts and decomposes between 110 and 115° C. The base, which is isolated from this dihydrochloride in a conventional manner, analyzes as follows:

*Analysis.*—Calculated for $C_{15}H_{26}N_4O_3$ (percent): C, 58.06; H, 8.39; N, 18.06. Found (percent): C, 58.00–58.14; H, 8.43–8.44; N, 18.09–18.30.

EXAMPLE 5

First method of preparing 1-methylamino-2-nitro-4-(N'-methyl-N'-β-aminoethyl)amino benzene

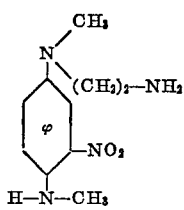

A mixture of 0.2 mol (36.2 g.) of 1-methylamino-2-nitro-4-N'-methylamino benzene, 15 g. of calcium carbonate and 200 cm.³ of water is brought to reflux. 0.3 mol (61.5 g.) of β-bromoethylamine hydrobromide in solution in 100 cm.³ of water is introduced, little by little, while stirring. After cooling 5 g. of the initial product which has not reacted is recovered by drying. The filtrate, which contains the resulting product in the form of the hydrochloride, is extracted with ethyl acetate to eliminate any traces of the initial product. The aqueous phase is alkalized to pH=11 with a 5 N sodium hydroxide solution, in order to liberate 1-N-methylamino-2-nitro-4-(N'-methyl-N'-β-aminoethyl)amino benzene in the form of an oil. This oil is extracted with ethyl acetate, the ethyl acetate solution is concentrated to about 100 cm.³, 20 cm.³ of acetic anhydride is added little by little. The mixture is heated to reflux for a quarter of an hour and, after cooling, drying yields 37 g. of 1-N-methylamino-2-nitro-4-(N'-methyl-N'-β-acetylaminoethyl)-amino benzene which, after recrystallization in alcohol, melts at 127° C.

34 g. of this acetylated derivative (F=127° C.) is heated to reflux for 30 minutes in 150 cm.³ of concentrated hydrochloric acid. After chilling and dilution, 5 N sodium hydroxide is added until the solution reaches pH=5. Drying yields 34.25 g. of practically pure monohydrochloride of 1-methylamino-2-nitro-4-(N'-methyl-N'-aminoethyl)-amino benzene.

The base, when isolated from this monohydrochloride in the conventional manner, is an oil which yields the following results when analyzed:

*Analysis.*—Calculated for $C_{10}H_{16}N_4O_2$ (percent): C, 53.57; H, 7.14; N, 25.00. Found (percent): C, 53.77–53.65; H, 7.15–7.28; N, 24.82–24.85.

EXAMPLE 6

Second method of preparing 1-methylamino-2-nitro-4-(N'-methyl-N'-β-aminoethyl)-amino benzene First step: Preparation of 1-methylamino-2-nitro-4-(N'-β-chloroethyl)amino benzene.

0.33 mol (74 g.) of 1-methylamino-2-nitro-4-(N'-methyl-N'-β-hydroxyethyl)amino-benzene is dissolved in 750 cm.³ of dichloroethane. 0,37 mol (26 cm.³) of thionyl chloride is added while stirring at room temperature. It is carried to reflux for an hour and chilled. Drying yields 75 g. of 1-methylamino-2-nitro-4-(N'-methyl-N'-β-chloroethyl)-amino benzene in the form of the hydrochloride. After being dissolved in normal hydrochloric acid, boiled with a little animal black, filtered and chilled, it is rendered alkaline by use of a normal sodium hydroxide solution. Drying yields 58 g. of a chlorinated derivative which, after recrystallization in a benzene-hexane mixture, melts at 90° C. The analysis of the end product is:

*Analysis.*—Calculated for $C_{10}H_{14}N_3O_2Cl$ (percent): C, 49.28; H, 5.74; N, 17.24. Found (percent): C, 49.52–49.51; H, 5.79–5.89; N, 17.45–17.28.

Second step: A mixture of 0.02 mol (4.87 g.) of 1-methylamino - 2 - nitro-4-(N'-methyl-N'-β-chloroethyl) amino benzene and 0.022 mol (4.07 g.) of potassium phthalimide is carefully prepared by grinding, and then heated at 130–140° C. for 1 hour. After chilling and grinding the reaction mixture, washing with water eliminates the resultant potassium chloride and any potassium phthalimide which has not reacted. The fraction insoluble in water (6.53 g.) yields, after recrystallization in benzene, 5.5 g. of practically pure 1-methylamino-2-nitro-4-N'-methyl-N'-(β-phthalimidoethyl) - amino benzene which melts at 190° C. The analysis of this product is:

*Analysis.*—Calculated for $C_{18}H_{18}N_4O_4$ (percent): C, 61.01; H, 5.08; N, 15.81. Found (percent): C, 60.94–61.18; H, 5.30–5.18; N, 15.89–15.96.

0.014 mol (5 g.) of the substituted phthalimide obtained in the first step, in solution in propanol, is heated to reflux for 2 hours with a slight excess of hydrazine hydrate. After chilling, drying yields phthalhydrazide which is insoluble in propanol. Then dry gaseous hydrochloric acid is bubbled through to precipitate 2.3 g. of dihydrochloride of 1-methylamino-2-nitro-4-(N'-methyl-N'-β-aminoethyl)amino benzene.

After this dihydrochloride has been recrystallized in a mixture of propanol and hydrochloric acid of density 1.19, a practically pure oily base is liberated in the conventional manner. The analysis of this product is:

*Analysis.*—Calculated for $C_{10}H_{16}N_4O_2$ (percent): C, 53.57; H, 7.14; N, 25.00. Found (percent): C, 53.50–53.62; H, 7.12–7.15; N, 24.81–24.93.

EXAMPLE 7

Preparation of dihydrochloride of 1-methylamino-2-nitro - 4 - (N'-methyl-N'-β-diethylaminoethyl)-amino benzene

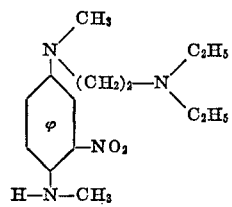

0.00617 mol (1.5 g.) of 1-methylamino-2-nitro-4-(N'-methyl-N'-β-chloroethyl)amino benzene prepared as described in the first step of Example 6 and 0.074 mol (7.6 cm.³) of diethylamine are heated to 120° C. in a sealed tube for 15 hours. After chilling, the hydrochloride of diethylamine is eliminated by filtration and the excess diethylamine is driven off under vacuum.

The oily residue is dissolved in ethyl acetate, the ethyl acetate solution is washed with water, dried on sodium sulfate and filtered. It is chilled and, after passage of gaseous hydrochloric acid, drying yields 1.9 g. of practically pure dihydrochloride of 1-methylamino-2-nitro-4-(N'-methyl - N' - β - diethylaminoethyl)amino-benzene. After crystallization in a mixture of propanol and hydrochloric acid, it melts with decomposition between 120 and 125° C. The analysis of this product is:

Analysis.—Calculated for $C_{14}H_{26}N_4O_2Cl_2$ (percent): C, 47.59; H, 7.36; N, 15.86. Found (percent): C, 47.23–47.20; H, 7.47–7.58; N, 15.67–15.58.

EXAMPLE 8

Preparation of 1-N-methylamino-2-nitro-4-[N'-methyl-N'-β-piperidino-ethyl]amino benzene

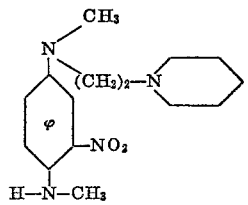

0.041 mol (10 g.) of 1-methylamino-2-nitro-4-(N'-methyl-N'-β-chloroethyl)amino benzene is dissolved in 33 cm.³ of piperidine and the solution is heated for 8 hours at 115–120° C. It is cooled and the hydrochloride of piperidine is eliminated by filtration and the excess piperidine is driven off under vacuum. 12 g. of a crystallized product are obtained, which after washing with water, drying and recrystallization in hexane, yield 10 g. of pure 1-methylamino-2-nitro-4-(N'-methyl-N'-β-piperidino-ethyl) amino benzene which melts at 74° C. The analysis of this product is:

Analysis.—Calculated for $C_{15}H_{24}N_4O_2$ (percent): C, 61.64; H, 8.21; N, 19.17. Found (percent): C, 62.00–61.98; H, 8.18–8.30; N, 19.41–19.29.

EXAMPLE 9.—QUATERNIZATION OF THE DYE PREPARED IN EXAMPLE 8

Preparation of iodide of β-[N-methyl-N-(3-nitro-4-N'-methylamino)-phenyl]aminoethylmethyl piperidinium 0.0274 mol (8 g.) of the 1-methylamino-2-nitro-4-(N'-methyl-N'-β-piperidinoethyl)amino benzene prepared in Example 8 is dissolved in 80 cm.³ of benzene. 0.0274 mol (1.7 cm.³) of methyl iodide is added little by little, while stirring, and the reaction mixture is left for 2 days at the ambient temperature. Drying yields 10 g. of the quaternary product which melts with decomposition at 178–180° C.

EXAMPLE 10

Preparation of 1 - N-methylamino-2-nitro-4-[N'-methyl-N' - β - (methylhydroxyethyl)amino ethyl]amino benzene

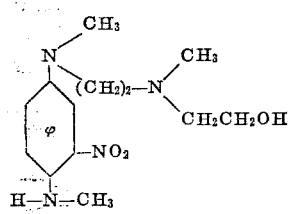

A mixture of 0.0985 mol (24 g.) of 1-methylamino-2-nitro-4-(N'-methyl-N'-β-chloroethyl)amino benzene and 0.788 mol (59.2 g.) of methylethanolamine is heated for 8 hours at 120–130° C.

The excess methylethanolamine is driven off under vacuum. The oily residue is dissolved in benzene. This benzene solution is washed with water, dried on sodium sulfate and filtered. After the benzene has been driven off under vacuum, 26.2 g. of 1-methylamino-2-nitro-4-[(N'-methyl-N' - β - (methyl-hydroxyethyl)aminoethylamino] benzene are obtained in the form of a violet oil.

This oil is dissolved in 100 cm.³ of propyl alcohol and after passage of gaseous hydrochloric acid, drying yields 30 g. of practically pure dihydrochloride which melts with decomposition between 115 and 120° C. The analysis of the base, which is isolated in the conventional manner from the pure dihydrochloride, is:

Analysis.—Calculated for $C_{13}H_{22}O_3N_4$ (percent): C, 55.32; H, 7.80; N, 19.85. Found (percent): C, 55.45–55.28; H, 7.63–7.80; N, 19.58–19.77.

EXAMPLE 11

Preparation of 1 N-β-(hydroxethyl-methyl)-amino-ethylamino-2-nitro-4-N'-methylamino benzene

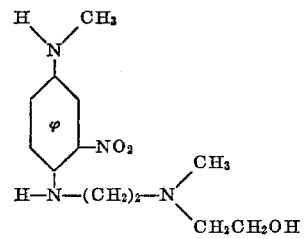

First step: Preparation of 1-N-β-chloroethylamino-2-nitro-4-N'-methylamino benzene.

0.076 mol (5.5 cm.³) of thionyl chloride dissolved in 50 cm.³ of 1-dichloro-2-ethane is added little by little, while rigorously stirring, to a solution of 0.071 mol (15 g.) of 1-N-β-hydroxyethylamino - 2 - nitro-4-N'-methylamino benzene in 150 cm.³ of 1-dichloro-2-ethane. It is heated to reflux for 2 hours. Drying then yields, after cooling, 17 g. of a crude product in the form of the hydrochloride. This product must be purified. To accomplish this, it is dissolved in 200 cm.³ of water, the pH is brought to 3 with sodium carbonate, and drying yields 12 of 1-N-β-chloroethylamino-2-nitro-4-N'-methylamino benzene containing a little thionylamine as an impurity. It is dissolved in 5 N hydrochloric acid to hydrolyze the thionylamine which it contains. Drying yields 12 g. of the product, which is heated to reflux for ½ hour. After cooling, drying yields 10 g. of almost pure hydrochloride of 1-N-β-chloroethylamino - 2 - nitro-4-N'-methylamino benzene. It is redissolved in water, the pH is brought to 3 using sodium carbonate and drying yields 9 g. of the product which, after recrystallization in a mixture of benzene and hexane, melts at 98° C. The analysis of the end product is:

Analysis.—Calculated for $C_9H_{12}N_3O_2Cl$ (percent): C, 47.05; H, 5.22; N, 18.30. Found (percent): C, 47.28–47.14; H, 5.40–5.50; N, 18.56–18.42.

Second step: 0.0366 mol (8.4 g.) of 1-N-β-chloroethylamino-2-nitro-4-N'-methylamino benzene is dissolved in 0.2928 mol (22 g.) of methylethanolamine. It is heated for 8 hours at 120–130° C. and cooled and the excess methylethanolamine is driven off under vacuum.

The residue is dissolved in water to dissolve the hydrochloride of methylethanolamine and drying yields 8.8 g. of 1 - N - β-(hydroxyethyl-methylamino)-ethylamino-2-nitro-4-N'-methylamino benzene which, after recrystallization in benzene, melts at 85° C. The analysis of this product is:

Analysis.—Calculated for $C_{12}H_{20}N_4O_3$ (percent): C, 53.73; H, 7.46; N, 20.89. Found (percent): C, 53.44–53.65; H, 7.50–7.56; N, 20.93–21.01.

EXAMPLE 12

Preparation of 1-N-β-piperidinoethylamino-2-nitro-4-N'-methylamino benzene

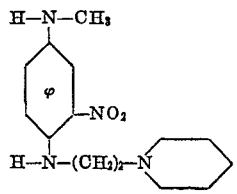

0.0166 mol (3.8 g.) of 1-N-β-chloroethylamino-2-nitro-4-N'-methylamino benzene prepared as described in the first step of Example 11 is dissolved in 18 cm.³ of piperidine. It is heated to reflux for 8 hours and cooled and the hydrochloride of piperidine is eliminated by filtration while the excess piperidine is driven off under vacuum. 5 g. of crystallized product are obtained which, after being washed with water, dried and recrystallized in a mixture of hexane and benzene, yield 4.45 g. of 1-N-β-piperidinoethylamino - 2 - nitro-4-N'-methylamino benzene which melts at 103° C. The analysis of this product is:

*Analysis.*—Calculated for $C_{14}H_{22}N_4O_2$ (percent): C, 60.43; H, 7.91; N, 20.14. Found (percent): C, 60.37–60.17; H, 8.07–7.89; N, 20.03–20.06.

EXAMPLE 13—QUATERNIZATION OF THE PRODUCT PREPARED IN EXAMPLE 12

Preparation of iodide of β-[N-(2-nitro-4-N'-methylamino)-phenyl]-amino-ethyl-methyl-piperidinium 0.02 mol (5.56 g.) of 1-N-β-piperidinoethylamino-2-nitro-4-N'-methylamino benzene is dissolved in 50 cm.³ of benzene. 0.02 mol (1.25 cm.³) of methyl iodide in 10 cm.³ of benzene is added little by little.

The reaction mixture is left for 2 days at the ambient temperature. Drying yields 8 g. of the quaternary compound named in the title of the present example. This product melts with decomposition at 130° C.

EXAMPLE 14

Preparation of 1-N-β-diethylaminoethyl-amino-2-nitro-4-N'-methylamino benzene

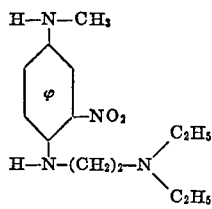

First step: Preparation of 1-N-benzenesulfonylamino-2-nitro-4-(N'-methyl-N'-acetyl)-amino benzene.

This product is prepared in the usual manner by reacting benzenesulfochloride with 1-amino-2-nitro-4-methylacetamino benzene in solution in pyridine.

After recrystallization in alcohol, this product melts at 144° C. The analysis of this product is:

*Analysis.*—Calculated for $C_{15}H_{15}N_3O_5S$ (percent): C, 51.57; H, 4.29; N, 12.03. Found (percent): C, 51.38–51.30; H, 4.32–4.43; N, 12.23–12.18.

Second step: Preparation of 1-(N-benzene-sulfonyl-N-β - diethylaminoethyl) - amino - 2 - nitro - 4 - (N' -methyl-N'-acetyl)-amino benzene.

0.152 mol (26 g.) of hydrochloride of diethylaminoethylchloride in solution in 100 cm.³ of water and 100 cm.³ of 2 N sodium hydroxide are simultaneously added little by little to a solution of 0.05 mol (17.4 g.) of 1-N-benzenesulfonyl-amino-2-nitro-4-(N'-methyl-N' - acetyl)-amino benzene in 60 cm.³ of normal sodium hydroxide at about 60° C. The addition finished, the reaction mixture is kept at 60° C. for 3 hours. After cooling, it is extracted with ethyl acetate and the ethyl acetate solution is washed first with normal sodium hydroxide, and then with water to eliminate the initial product in the form of its tosylate. The product is then extracted, using iced normal hydrochloric acid, in the form of its hydrochloride. Alkalization of this hydrochloric solution using normal sodium hydroxide leads to the precipitation of 9 g. of 1-(N-benzenesulfonyl-N-β-diethylaminoethyl)-amino-2-nitro - 4 - (N'-methyl-N'-acetyl)-amino benzene which, after recrystallization in a mixture of toluene and hexane, melts at 120° C. Its analysis is:

*Analysis.*—Calculated for, $C_{21}H_{28}O_5N_4S$ (percent): C, 56.25; H, 6.25; N, 12.50. Found (percent): C, 56.43–56.23; H, 6.29–6.15; N, 12.67–12.68.

Third step: 0.0133 mol (6 g.) of 1-[N-benzenesulfonyl-N-β-diethylaminoethyl]-amino-2-nitro-4-(N'-methyl - N'-acetyl)-amino benzene in 50 cm.³ of concentrated hydrochloric acid is heated to reflux for 2 hours. After dilution, it is cooled while adding 5 N sosium hydroxide. Drying yields 3.2 g. of 1-N-β-diethylaminoethylamino-2-nitro-4-methylamino benzene which after recrystallization in a mixture of benzene and hexane, melts at 74° C.

The analysis of this product is:

*Analysis.*—Calculated for $C_{13}H_{22}N_4O_2$ (percent): C, 58.64; H, 8.27; N, 21.05. Found (percent); C, 59.69–58.71; H, 8.17–8.31; N, 21.34–21.27.

EXAMPLE 15

First method of preparing 1-N-β-(diethylamino)ethyl-amino-2-nitro-4-amino benzene

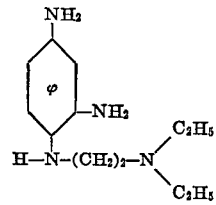

First step: Preparation of 1-N-β-chloroethylamino-2-nitro-4-amino benzene.

0.0570 mol (11.2 g.) of 1-N-β-hydroxyethylamino-2-nitro-4-amino benzene is dissolved in 150 cm.³ of 1,2-dichloro ethane, 0.114 mol (8.3 cm.³) of thionyl chloride in 50 cm.³ of 1,2-dichloro-ethane is poured into this solution little by little, at reflux, and while stirring, and reflux is continued for two hours. About 100 cm.³ of the solvent is driven off under vacuum and, after cooling and adding a little hexane, drying yields 9.2 g. of 1-N-β-chloroethylamino-2-nitro-4-thionylamino benzene which, after recrystallization in benzene, melts at 116° C.

Analysis of this product yields the following results:

*Analysis.*—Calculated for $C_8H_8O_3N_3ClS$ (percent): C, 36.75; H, 3.03; N, 16.07; Cl, 13.58. Found (percent): C, 36.96–36.95; H, 3.24–3.27; N, 16.19–16.31; Cl. 13.53.

The filtrate contains 1-N-β-chloroethylamino-2-nitro-4-amino benzene.

After drying the thionylamine as hereinbefore indicated, the filtrate is saturated with dry gaseous hydrochloric acid, after which drying yields 4 g. of 1-N-β-chloroethyl-amino-2-nitro-4-amino benzene hydrochloride. This hydrochloride is dissolved in ice water and its pH adjusted to 4 by adding ammonia. Drying then yields 3 g. of 1-N-β-chloroethylamino-2-nitro-4-amino benzene which, after recrystallization in benzene, melts at 115° C.

Analysis of this product yields the following results:

*Analysis.*—Calculated for $C_8H_{10}O_2N_3Cl$ (percent): C, 44.54; H, 4.64; N, 19.48. Found (percent): C, 44.55–44.58; H, 4.42–4.40; N, 19.68–19.65.

In order to hydrolyze the 9.2 g. of thionylamine yielded in the first part of this step of the process, the 9.2 g. of 1-N-β-chloroethylamino-2-nitro-4-thionylamino benzene is heated for two hours in a boiling water bath, in 300 cm.³ of 1½ N hydrochloric acid. It is then cooled and ammonia added to adjust the pH value to 4. Drying then yields 7.5 g. of practically pure 1-N-β-chloroethylamino-2-nitro-4-amino benzene, which melts at 115° C.

Second step: 0.0139 mol (3 g.) of 1-N-β-chloroethyl-amino-2-nitro-4-amino benzene and 0.167 mol (12.25 g.) of diethylamine is heated in a sealed tube at 120° C. for 20 hours. After cooling, the diethylamine hydrochloride is eliminated by filtration, and the excess of diethylamine is driven off under a vacuum. The oily residue is dissolved in benzene, the benzenic solution washed with water, dried with sodium sulfate, and filtered. The benzene is driven off under vacuum and the result is 3.34 g. of a crystalline product which after crystallization in benzene-hexane, melts at 65° C.

Analysis of this product yields the following results:

*Analysis.*—Calculated for $C_{21}H_{28}O_5N_4S$ (percent): C, 57.15; H, 7.94; N, 22.21. Found (percent): C, 56.92–56.90; H, 7.83–8.12; N, 22.16.

EXAMPLE 16

Second method of preparing 1-N-β-(diethylamino) ethylamino-2-nitro-4-amino benzene First step: Preparation of 1-N-p-toluene-sulfonyl-amino-2-nitro-4-acetylamino benzene.

This product is prepared in the usual manner, by reacting p-toluene sulfochloride with 1-amino-2-nitro-4-acetyl-amino benzene in solution in pyridine.

After recrystallization in alcohol, this product melts at 161.5° C. and its analysis yield the following results:

*Analysis.*—Calculated for $C_{15}H_{15}N_3O_5S$ (percent): C, 51.57; H, 4.29; N, 12.03. Found (percent): C, 51.51–51.77; H, 4.42–4.12; N, 12.11–12.12.

Second step: Preparation of 1-N-p-toluenesulfonyl-N-β-diethylaminoethyl-amino-2-nitro-4-acetylamino benzene.

0.086 mol (14.8 g.) of β-diethylaminoethylchloride hydrochloride in solution in 50 cm.³ of water, and 60 cm.³ of 2 N sodium hydroxide, are simultaneously added little by little, at about 60° C., to a solution of 0.0286 mol (10 g.) of 1-N-p-toluene-sulfonyl-amino-2-nitro-4-acetyl-amino benzene in 40 cm.³ of normal sodium hydroxide. When this addition has been completed, the reaction mixture is kept for three hours at 60° C. After cooling, it is extracted with ethyl acetate, and the resulting ethyl acetate solution washed first with sodium hydroxide and then with water in order to eliminate the starting product in the form of the tosylate. The product is then extracted in the form of its hydrochloride, using iced normal hydrochloric acid. The resulting solution is alkalized with sodium hydroxide and 7 g. of 1-(N-p-toluenesulfonyl-N-β-diethylaminoethyl) - amino-2-nitro-4-acetylamino benzene is precipitated. When dried under vacuum and recrystallized in a toluene-hexane mixture, this melts at 166° C.

The analysis of this product yields the following results:

*Analysis.*—Calculated for $C_{21}H_{28}O_5N_4S$ (percent) C, 56.25; H, 6.25; N, 12.50. Found (percent): C, 56.13–56.30; H, 6.29–6.32; N, 12.40–12.45.

Third step: Preparation of 1-N-β-(diethylamino)-ethylamino-2-nitro-4-acetylamino benzene.

0.02 mol (8.96 g.) of 1-(N-φ-toluenesulfonyl-N-β-diethylamino)-ethylamino-2-nitro-4-acetylamino benzene in 20 cm.³ of chilled concentrated sulfuric acid is added little by little while stirring. The addition finished, the reaction mixture is left for three hours at 15° C. It is poured over ice and alkalized with sodium hydroxide.

Drying yields 5.8 g. of 1-N-β-(diethylamino)-ethylamino-2-nitro-4-acetylamino benzene which, after recrystallization in alcohol and drying under vacuum in the presence of phosphoric anhdride, melts at 96° C.

The analysis of this product is:

*Analysis.*—Calculated for $C_{14}H_{22}O_3N_4$ (percent): C, 57.14; H, 7.48; N, 19.04: Found (percent): C, 57.34–57.40; H, 7.54–7.52; N, 19.24–19.20.

Fourth step: 0.02 mol (5.9 g.) of 1-N-β-(diethyl-amino)-ethylamino-2-nitro-4-acetylamino benzene is dissolved in 30 cm.³ of 5 N hydrochloric acid, then heated for 1 hour to reflux. After cooling it is alkalized and, on drying, yields 5 g. of 1-N-β-(diethylamino)-ethyl-amino-2-nitro-4-amino benzene which, after recrystallization in a mixture of benzene and hexane, melts at 65–66° C. (When mixed with the product prepared in Example 15, the melting point is not lowered.)

EXAMPLE 17

Preparation of -1-N-β-(methyl-hydroxyethyl)-amino-ethyl-amino-2-nitro-4-amino benzene

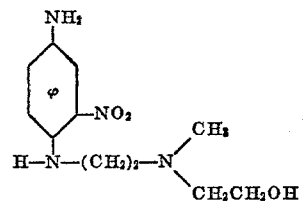

0.02 mol (4.31 g.) of 1-N-β-chloroethylamino-2-nitro-4-aminobenzene is dissolved in 12 g. of N-N-methyl-β-hydroxyethylamine and the solution is kept at 120–130° C. for 9 hours. The excess methylethanolamine is driven of under vacuum and the oily residue is redissolved in ethyl acetate. The ethyl acetate solution is washed with water, dried using sodium sulfate and filtered.

The solvent is driven off under vacuum and 5 g. of a crystallized product is obtained which, after recrystallization in benzene, melts at 89° C.

The analysis of the end product is:

*Analysis.*—Calculated for $C_{11}H_{18}O_3N_4$ (percent): C, 51.96; H, 7.08; N, 22.05. Found (percent): C, 51.84–51.80; H, 7.06– 7.14; N, 22.11–22.10.

EXAMPLE 18

Preparation of 1-N-β-piperidinoethylamino - 2-nitro-4-amino benzene

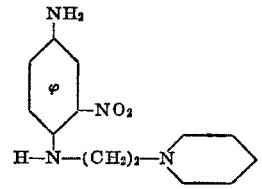

A solution of 0.0695 mol (15 g.) of 1-N-β-chloroethyl-amino-2-nitro-4-amino benzene, prepared as in the first step of Example 15, in 75 cm.³ of piperidine is carried to reflux for 8 hours. After cooling, drying yields piperidine hydrochloride, the excess piperidine is driven off under vacuum and the oily residue is dissolved in 100 cm.³ of benzene. The benzene solution is washed with water, dried using sodium sulfate and filtered. After the benzene has been driven off under vacuum, 18.1 g. of 1-N-β- piperidinoethylamino-2-nitro-4-amino benzene is obtained which, after recrystallization in a mixture of benzene and hexane, melts at 91° C.

The analysis of this product is:

*Analysis.*—Calculated for $C_{13}H_{20}N_4O_2$ (percent): C, 59.09; H, 7.57; N, 21.21. Found (percent): C, 59.39–59.25; H, 7.74–7.56; N, 21.43.29.

EXAMPLE 19—QUATERNIZATION OF THE PRODUCT PREPARED IN EXAMPLE 18

Preparation of the iodide of β-[N-(2-nitro-4-amino) phenyl]-aminoethyl-methyl piperidinium 0.02 mol (5.28 g.) of 1-N-β-piperidinoethylamino-2-nitro-4-amino benzene is dissolved in 50 cm.³ of toluene. 0.02 mol (1.25 cm.³) of methyl iodide in 10 cm.³ of benzene is added little by little. The reaction mixture is left for 3 days at ordinary temperature and drying yields 8.2 g. of the quaternary compound having the formula cited in the title of the present example. This compound melts with decomposition at 125° C.

EXAMPLE 20

Preparation of 1-N-β-aminoethylamino-2-nitro-4-N'-bis-β-hydroxyethylamino benzene

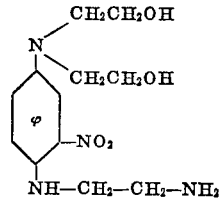

First step: The first step is to prepare 1-N-β-chloroethylamino-2-nitro-4-amino benzene as described in the first step of Example 15 of the present application.

Second step: Preparation of 1-N-β-chloroethylamino-2-nitro-4-N'-bis-β-hydroxyethylamino benzene.

0.05 mol (10.75) g. of 1-N-β-chloroethylamino-2-nitro-4-amino benzene is dissolved in 120 cm.³ of alcohol at 95° mixed with 10 cm.³ of water. At the ambient temperature, this solution is saturated with ethylene oxide and the reaction is continued until a chromatography on paper carried out on a sample no longer shows the presence of either the starting product or of 1-N-β-chloroethylamino-2-nitro - 4 - N'-β-hydroxyethylamino benzene. The alcohol is driven off under vacuum. 15.1 g. of an oil consisting of practically pure 1-N-β-chloroethylamino-2-nitro-4-N'-bis-β-hydroxyethylamino benzene are obtained.

Third step: Preparation of 1-N-β-phthalimidoethylamino-2-nitro-4-N'-bis-β-hydroxyethylamino benzene.

0.070 mol (21.2 g.) of 1-N-β-chloroethylamino-2-nitro-4-N'-bis-β-hydroxyethylamino benzene is dissolved in 67 cm.³ of dimethylformamide. 0.104 mol (19.5 g.) of potassium phthalimide is added and the reaction mixture is heated for one hour in a boiling water-bath. It is filtered hot. Addition of water to the filtrate causes the precipitation of 21 g. of 1-N-β-phthalimidoethylamino-2-nitro-4-N'-bis-β-hydroxyethylamino benzene which, after recrystallization in normal propyl alcohol, melts at 140° C.

The analysis of this product is:

*Analysis.*—Calculated for $C_{20}H_{22}N_4O_6$ (percent): C, 57.97; H, 5.31; N, 13.52. Found (percent): C, 57.85–57.76; H, 5.50–5.44; N, 13.46–14.61.

Fourth step: Preparation of dihydrochloride of 1-N-β-aminoethylamino - 2 - nitro-4-N'-bis-β-hydroxyethylamino benzene.

0.0282 mol (11.67 g.) of 1-N-β-phthalimidoethylamino-2-nitro-4-N'-bis-β-hydroxyethylamino benzene in solution in 200 cm.³ of normal propyl alcohol is heated to reflux for 2 hours with 0.423 mol (1.8 cm.³) of 98% hydrazine hydrate. It is filtered while boiling; part of the propyl alcohol is driven off under vacuum and, after cooling, drying yields 11.5 g. of the desired product in the form of the salt, the primary amine function being salified by the phthalhydrazide. This product is dissolved in water and strongly alkalized with sodium hydroxide. The desired product is extracted with butanol, while the phthalhydrazide is eliminated in the aqueous phase in the form of the sodium salt. After the butanol has been driven off under vacuum, 7 g. of an oil consisting of practically pure 1 - N - β - aminoethylamino - 2 - nitro-4-N'-bis-β-hydroxyethylamino-benzene are obtained. The oily product is dissolved in normal propyl alcohol and the solution is saturated with dry hydrochloric acid. Drying yields the dihydrochloride of 1-N-β-aminoethylamino-2-nitro-4-N'-bis-β-hydroxyethylamino benzene which melts with decomposition between 158 and 163° C.

The analysis of this product is:

*Analysis.*—Calculated for $C_{12}H_{22}N_4O_4Cl_2$ (percent): C, 40.33; H, 6.16; N, 15.68. Found (percent): C, 40.44–40.29; H, 6.40–6.35; N, 15.24–15.44.

EXAMPLE 21

Preparation of the dihydrochloride of 1-N-β-hydroxyethylamino - 2 - nitro-4-N'-methyl-N'-β-diethylaminoethyl-aminobenzene The reactions utilized to prepare this product may be schematically represented in the following manner:

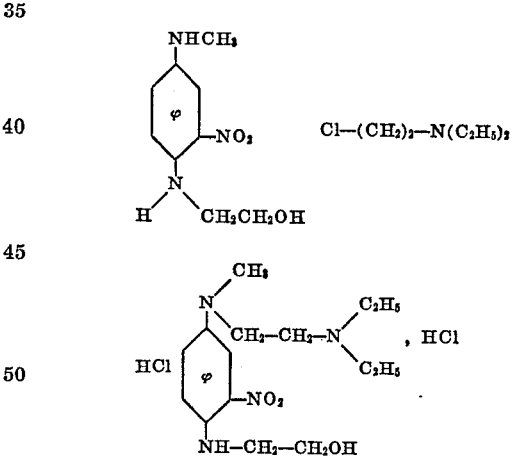

A mixture composed of 0.237 mol (50 g.) of 1-N-β-hydroxyethylamino - 2 - nitro-4-N'-methyl-amino benzene, 200 cm.³ of water and 20 g. of calcium carbonate is brought to reflux. 0.355 mol (61 g.) of the hydrochloride of β-diethylamino-ethylchloride in solution in 120 cm.³ of water is added little by little while stirring. After the reflux has been maintained for 3 hours, it is filtered hot. After the filtrate has been chilled, it is alkalized with sodium hydroxide and the end product is extracted with ethyl acetate.

The ethyl acetate solution is washed with water and dried on sodium sulfate, and the solvent is driven off under vacuum. The 65 g. of oily residue are dissolved in 500 cm.³ of propanol. This cooled propanolic solution is saturated with dry gaseous hydrochloric acid and drying yields 71.5 g. of the dihydrochloride of 1-N-β-hydroxyethylamino-2-nitro - 4 - (N'-methyl-N'-β-diethylaminoethyl)-amino benzene, which melts with decomposition between 118 and 123° C.

The base isolated in the conventional manner from this dihydrochloride is an oil of which the analysis is:

*Analysis.*—Calculated for $C_{15}H_{26}N_4O_3$ (percent): C, 58.06; H, 8.39; N, 18.06. Found (percent): C, 58.31–58.14; H, 8.10–8.25; N, 18.27–18.25.

EXAMPLE 22

Preparation of dihydrochloride of 1-N-methylamino-2-nitro-4-N'-ω-aminobutylamino benzene The reactions utilized to prepare this product may be schematically represented in the following manner:

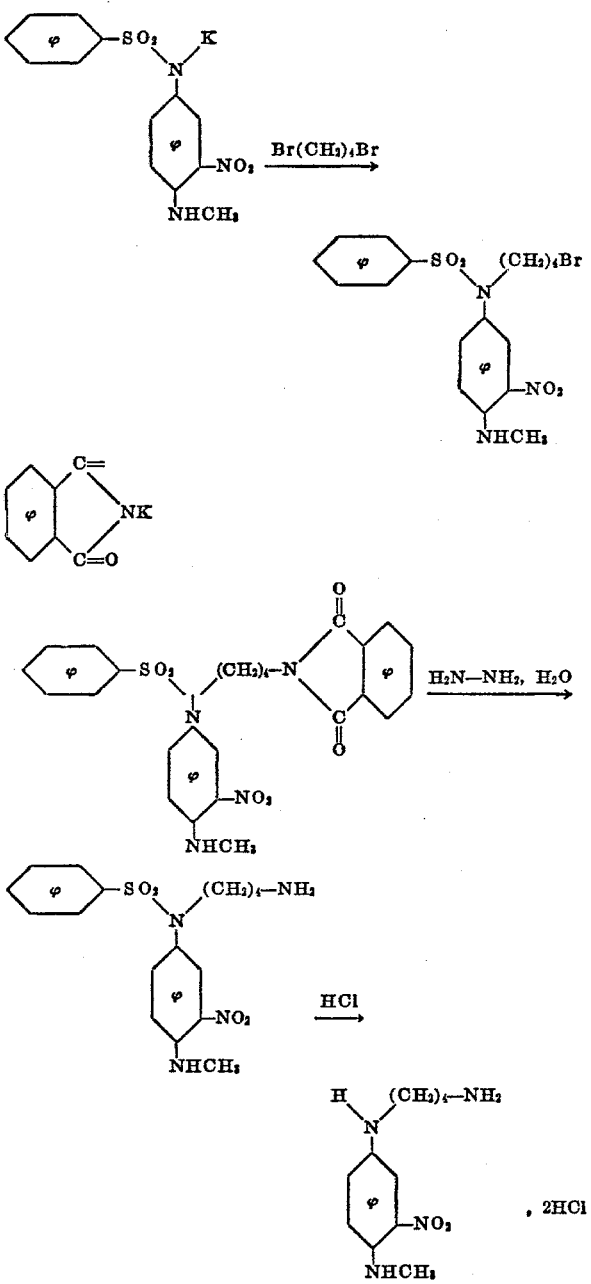

First step: Preparation of 1-N-methylamino-2-nitro-4-(N'-benzenesulfonyl-N'-ω-bromobutyl)-amino benzene.

0.4 mol (138 g.) of the potassium salt of 1-N-methylamino-2-nitro-4-N'-benzenesulfonylamino benzene is dissolved in 350 cm.³ of dimethylformamide. 0.8 mol (95.5 cm.³) of 1,4-dibromobutane is added, and the reaction mixture is kept at 90° C. for 30 minutes. It is cooled and poured into 2½ liters of water and drying yields 190 g. of a crude product which, after a fractional crystallization in benzene, yields:

On the one hand, 145 g. of 1-N-methylamino-2-nitro-4-(N' - benzenesulfonyl-N'-ω-bromobutyl)-amino benzene, which melts at 140° C. and of which the analysis is:

*Analysis.*—Calculated for $C_{17}H_{20}N_3O_4SBr$ (percent): C, 46.15; H, 4.52; N, 9.50. Found (percent): C, 46.30–46.24; H, 4.59–4.41; N, 9.53–9.77.

On the other hand, 30 g. of bis-[N'-(4-methylamino-3-nitro)-phenyl]-benzenesulfamidobutane which melts at 245° C. and of which the analysis is:

*Analysis.*—Calculated for $C_{30}H_{32}O_8N_6S_2$ (percent): C, 53.88; H, 4.79; N, 12.27. Found (percent): C, 53.78–53.70; H, 4.97–4.93; N, 12.45–12.40.

Second step: Preparation of 1-N-methylamino-2-nitro-4 - (N'-benzenesulfonyl-N'-phthalimidobutyl)-amino benzene.

0.25 mol (110.5 g.) of 1-N-methylamino-2-nitro-4-(N'-benzenesulfonyl-N'-ω-bromobutyl)-amino is dissolved in 500 cm.³ of dimethylformamide. 0.3 mol (55.5 g.) of potassium phthalimide is added, then the reaction mixture is heated for 1 hour in a boiling water-bath. It is poured into 4 liters of water and drying yields 126 g. of a crude product which, after recrystallization in a mixture of benzene and hexane melts at 141° C. The analysis of this product is:

*Analysis.*—Calculated for $C_{25}H_{24}N_4O_6S$ (percent): C, 59.05; H, 4.72; N, 11.02. Found (percent): C, 59.16–58.99; H, 4.89–4.90; N, 10.99–11.09.

Third step: Preparation of 1-N-methylamino-2-nitro-4-(N'-benzenesulfonyl-N'-ω-aminobutyl)-amino benzene.

0.04 mol of hydrazine hydrate is added to a solution of 0.02 mol (10.16 g.) of substituted phthalimide in 80 cm.³ of propanol, and then heated for 30 minutes in a boiling water-bath. Most of the resultant phthalhydrazide is eliminated by filtration of the hot reaction mixture. After cooling, an orange oil is isolated by decantation and dissolved in ethyl acetate. This ethyl acetate solution is extracted with a ½ N hydrochloric solution. The aqueous hydrochloric phase is alkalized, and drying yields 4.5 g. of 1-N-methylamino - 2 - nitro - 4-(N'-benzenesulfonyl-N'-ω-aminobutyl)-amino benzene which, after recrystallization in ethyl acetate, melts at 135° C. The analysis of this product is:

*Analysis.*—Calculated for $C_{17}H_{22}O_4N_4S$ (percent): C, 53.96; H, 5.82; N, 14.82. Found (percent): C, 54.11–53.95; H, 5.76–5.91; N, 14.93–14.80.

The cooled propanolic mother liquors are saturated with dry gaseous hydrochloric acid and 2 g. of the desired product are isolated by drying in the form of the hydrochloride.

Fourth step: Preparation of dihydrochloride of 1-N-methylamino-2-nitro-4-N'-ω-aminobutylamino benzene.

0.013 mol (5 g.) of 1 - N-methylamino-2-nitro-4-(N'-benzenesulfonyl-N'-ω-aminobutyl)-amino benzene in 15 cm.³ of concentrated hydrochloric acid is heated to reflux for 2 hours. An equal volume of alcohol is added to the cooled hydrochloric solution and drying yields 3.2 g. of the dihydrochloride of 1-N-methylamino-2-nitro-4-N'-ω-aminobutyl-amino benzene which, after recrystallization in concentrated hydrochloric acid, yields the following results when analyzed:

*Analysis.*—Calculated for $C_{11}H_{20}O_2N_4Cl_2$ (percent): C, 42.44; H, 6.43; N, 18.00. Found (percent): C, 42.49–42.38; H, 6.41–6.25; N, 18.05–18.10.

EXAMPLE 23

Preparation of dihydrochloride of 1 - N-methylamino-2-nitro - 4-N'-γ-[N''-(β-hydroxyethyl, methyl)]-γ-aminopropyl-amino benzene

17

The reactions utilized to prepare this product may be schematically represented in the following manner:

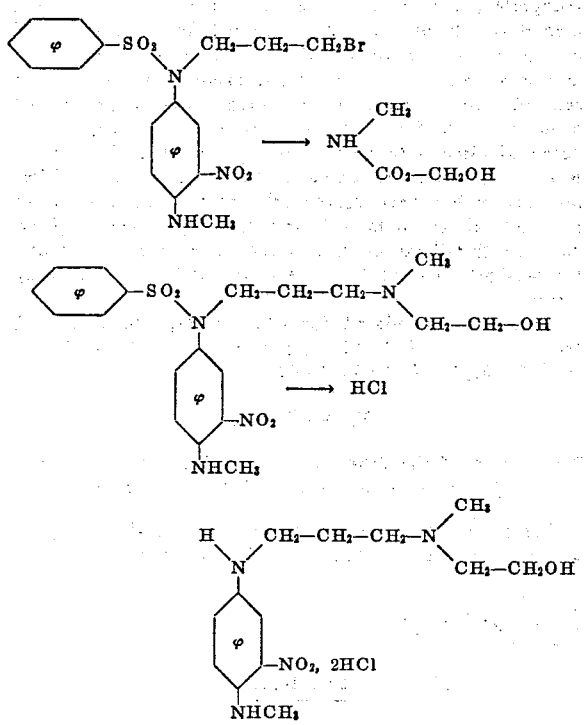

First step: Preparation of 1-N-methylamino-2-nitro-4-(N'-benzenesulfonyl-N'-γ-[N''-(β - hydroxyethyl-methyl] γ-aminopropyl)-amino benzene.

0.0466 mol (20 g.) of 1-N-methylamino-2-nitro-4- N'-benzenesulfonyl - N' - γ - bromopropyl) - amino benzene is heated in 0.373 mol (28 g.) of methyl-β-hydroxyethylamine for 7 hours at 120° C. The excess methyl-β-hydroxyethylamine is driven off under vacuum. The residue is recovered in iced 2 N hydrochloric acid. Drying then yields the desired product in the form of the hydrochloride. This hydrochloride is dissolved in hot water and rendered alkaline by means of a sodium hydroxide solution. After cooling, drying yields 16 g. of 1-N-methylamino - 2 - nitro - 4 - (N'-benzenesulfonyl-N'-γ-[N''-(β-hydroxyethyl - methyl)] - γ - aminopropyl)-amino benzene which, after recrystallization in methanol, melts at 85° C. The analysis of this product is:

Analysis.—Calculated for $C_{19}H_{26}N_4O_5S$ (percent): C, 54.02; H, 6.16; N, 13.27. Found (percent): C, 54.33–54.18; H, 6.23–6.30; N, 13.43–13.57.

Second step: Preparation of the dihydrochloride of 1 - N - methylamino - 2 - nitro - 4 - (N'-γ-[N''-(β-hydroxyethyl-methyl)]-γ-aminopropyl)-amino benzene.

0.048 mol (2.04 g.) of 1-N-methylamino - 2 - nitro-N'-benzenesulfonyl - 4 - (N'-γ-[N''-(β-hydroxyethyl-methyl)]-γ-amino-propyl)-amino benzene is heated to reflux for 2 hours in 6 cm.³ of concentrated hydrochloric acid. After dilution, it is alkalized with sodium hydroxide and the resulting solution is extracted using methylisobutylcetone. After the methylisobutylcetone has been driven off under vacuum, the oily residue is redissolved in normal propyl alcohol. The well-cooled alcoholic solution is saturated with dry gaseous hydrochloric acid. Drying yields 1.4 g. of the dihydrochloride of 1-N-methylamino-2 - nitro - 4 - (N'-γ-[N''-(β-hydroxyethyl-methyl)]-γ-aminopropyl)-amino benzene, which melts with decomposition at 160° C. The analysis of this product is:

Analysis.—Calculated for $C_{13}H_{24}N_4Cl_2O_3$ (percent): C, 43.94; H, 6.76; N, 15.77. Found (percent): C, 43.88–43.94; H, 6.72–6.52; N, 15.86–15.79.

18

EXAMPLE 24

Preparation of the dihydrochloride of 1-N-β-ethyl-amino-2-nitro-4-amino benzene

The reactions utilized to prepare this product may be schematically represented in the following manner:

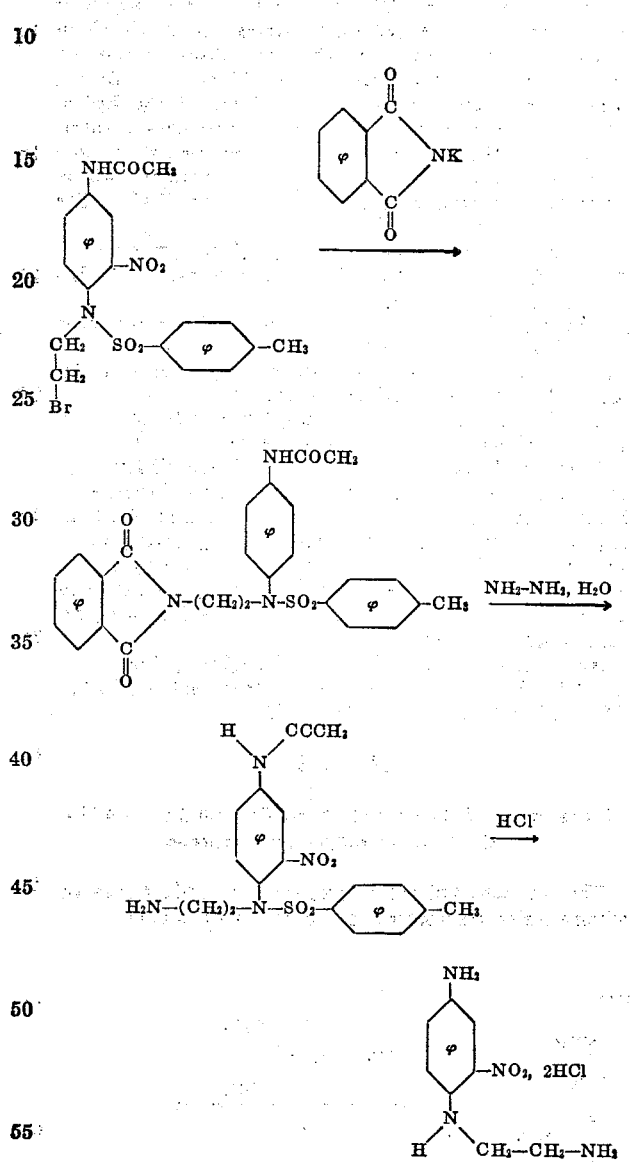

First step: Preparation of 1-(N-p-toluenesulfonyl-N-β-phthalimidoethyl)-amino - 2 nitro - 4 - N'-acetylamino benzene.

0.01 mol (4.56 g.) of 1-(N-p-toluenesulfonyl-N-β-bromoethyl)-amino-2-nitro-4-N'-acetylamino benzene is dissolved in 16 cm.³ of dimethylformamide. 0.012 mol of potassium phthalimide is added and the reaction mixture is heated for one hour in a boiling water-bath. While hot, it is filtered and poured into 200 cm.³ of water. Drying yields 5 g. of a crude product which, after recrystallization in a acetone-water mixture, melts at 205° C. The analysis of this product is:

Analysis.—Calculated for $C_{25}H_{22}O_7N_4S$ (percent): C, 57.47; H, 4.21; N, 10.72. Found (percent): C, 57.61–57.63; H, 4.37–4.31; N, 10.93–10.79.

Second step: Preparation of 1-(N-p-toluenesulfonyl-N-β-amino-ethyl)-amino-2-nitro-4-N'-acetylamino benzene.

0.215 mol (112.2 g.) of 1-(N-p-toluenesulfonyl-N-β-phthalimidoethyl)-amino-2-nitro-4-N'-acetylamino benzene is dissolved in 600 cm.³ of propanol. 0.43 mol (22 g.) of hydrazine hydrate is added to this solution and it is heated for 20 minutes in a boiling water-bath. By filtration of the hot reaction mixture, 34 g. of phthalhydrazide is isolated. The propanolic mother liquor is chilled at —5° C. A red oil separates out and is eliminated through decantation. Then the alcoholic solution is saturated with dry gaseous hydrochloric acid. Drying yields the desired product in the form of the hydrochloride. The base is liberated in the customary manner. 66 g. of 1-(N-p-toluenesulfonyl-N-β-amino-ethyl)-amino-2-nitro-4-N'-acetylamino benzene is thus obtained which, after recrystallization in pyridine, melts at 223° C. The analysis of this product is:

Analysis.—Calculated for $C_{17}H_{20}N_4SO_5$ (percent): C, 52.04; H, 5.10; N, 14.28. Found (percent): C, 51.82–51.90; H, 5.05–5.11; N, 14.21–14.08.

The oil eliminated in the course of the preparation crystallizes easily in methanol. This secondary product (F=175°) is 1-[N-β-(p-toluenesulfonyl)-aminoethyl]-amino-2-nitro-4-N'-acetylamino-benzene.

Third step: Preparation of dihydrochloride of 1-N-β-aminoethylamino-2-nitro-4-amino benzene.

0.102 mol (40 g.) of 1-(N-p-toluenesulfonyl-N-β-aminoethyl)-amino-2-nitro-4-N'-acetylamino benzene is heated with 200 cm.³ of 7 N hydrochloric acid in a boiling water-bath for 1 hour. After cooling, drying yields 26.7 g. of the dihydrochloride of 1-N-β-aminoethylamino-2-nitro-4-amino benzene which, after recrystallization in concentrated hydrochloric acid, yields the following results when analyzed:

Analysis.— Calculated for $C_8H_{14}N_4O_2Cl_2$ (percent): C, 35.69; H, 5.20; N, 20.82. Found (percent): C, 35.50–35.60; H, 5.01–5.10; N, 21.00–20.82.

EXAMPLE 25

Preparation of 1-N-β-hydroxyethylamino-2-nitro-4-N'-β-diethylaminoethylamino benzene The reactions utilized to prepare this product may be schematically represented in the following manner:

1257

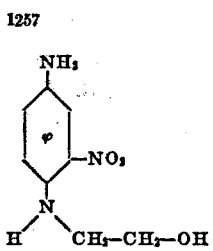
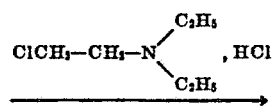
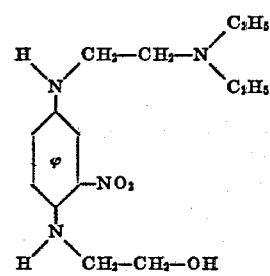

The mixture of 0.17 mol (33 g.) of 1-N-β-hydroxyethylamino-2-nitro-4-amino benzene, 250 cm.³ of water and 12 g. of calcium carbonate is brought to reflux. Little by little, under agitation, 0.19 mol (32.7 g.) of the hydrochloride of diethylaminoethylchloride in solution in 100 cm.³ of water is added. When the addition is completed, the reflux is carried on for another hour, then it is filtered hot and the cooled filtrate is extracted by means of methylisobutylcetone in order to eliminate any small amount of the initial product which has not reacted. The aqueous phase, which contains the desired product in the form of the monohydrochloride, is rendered alkaline with sodium hydroxide; then the desired product is extracted using methylisobutylcetone. After the solvent has been driven off under vacuum, 46 g. of a violet oil are obtained, and this crystallizes rapidly. After recrystallization in a cyclohexane-benzene mixture, the product melts at 73° C. Analysis yields the following results:

Analysis.—Calculated for $C_{14}H_{24}O_3N_4$ (percent): C, 56.76; H, 8.11; N, 18.92. Found (percent): 56.67–56.76; H, 7.98–8.17; N, 18.95–19.02.

EXAMPLE 26

Preparation of the dihydrochloride of 1-N-methylamino-2-nitro-4-N'-ω-aminohexylamino benzene The reactions utilized to prepare this product may be schematically represented in the following manner:

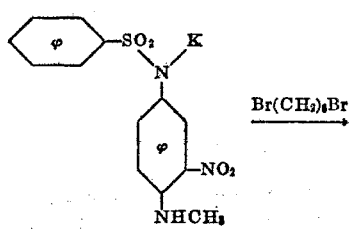
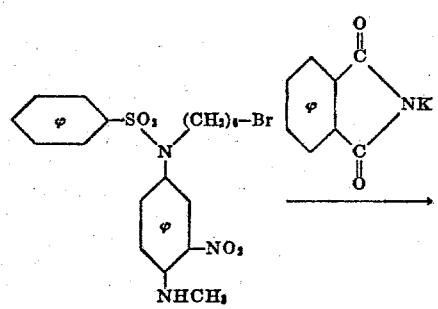
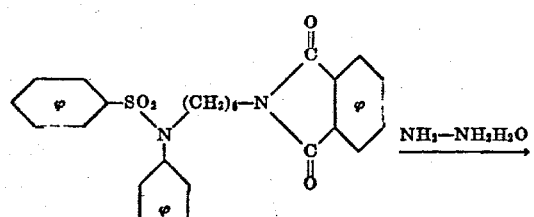
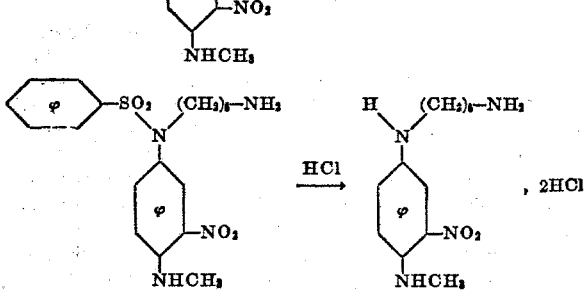

First step: Preparation of 1-N-methylamino-2-nitro-4-(N'-benzenesulfonyl-N'-ω-bromohexyl)-amino benzene.

0.05 mol (17.25 g.) of the potassium salt of 1-N-methylamino-2-nitro-4-N'-benzenesulfonylamino benzene is dissolved in 40 cm.³ of dimethylformamide. 0.1 mol (24.4 g.) of 1,6- dibromohexane is added and the reaction mixture is kept at 80° C. for 30 minutes. After being cooled, it is poured into 300 cm.³ of water. Drying yields 23.3 g. of a crude product which, after fractional crystallization in absolute alcohol, yields:

On the one hand, 17 g. of 1-N-methylamino-2-nitro-4-(N'-benzenesulfonyl-N'-ω-bromohexyl)-amino benzene which melts at 101° C. Analysis thereof yields the following results:

*Analysis.*—Calculated for $C_{19}H_{24}N_3BrSO_4$ (percent): C, 48.51; H, 5.10; N. 8.93. Found (percent): C, 48.52–48.30; H, 5.32–5.26; N, 9.18–9.20.

On the other hand, 4 g. of bis-N'-[4-N-methylamino-3-nitro-phenyl]-benzenesulfamidohexane, which melts at 200° C. Analysis thereof yields the following results:

*Analysis.*—Calculated for $C_{32}H_{36}N_6S_2O_8$ (percent): C, 55.17; H, 5.17; N. 12.06. Found (percent): C, 55.33–55.12; H, 5.13–5.12; N, 12.17–12.01.

Second step: Preparation of 1-N-methylamino-2-nitro-4-(N'-benzenesulfonyl-N' - ω - phthalimidohexyl)amino benzene.

0.0268 mol (12.6 g.) of 1-N-methylamino-2-nitro-4-(N'-benzenesulfonyl-N'-ω-bromohexyl)-amino benzene is dissolved in 50 cm.³ of dimethylformamide. 0.0322 mol (5.96 g.) of potassium phthalimide is added and the reaction mixture is heated for an hour in a boiling water-bath. It is poured into 400 cm.³ of water and drying yields 13.8 g. of a crude product which, after recrystallization in ethyl acetate, melts at 149° C. Analysis of the end product yields the following results:

*Analysis.*—Calculated for $C_{27}H_{28}N_4SO_6$ (percent): C, 60.44; H, 5.22; N, 10.44. Found (percent): C, 60.50–60.32; H, 5.50–5.48; N, 10.48–10.47.

Third step: Preparation of 1-N-methylamino-2-nitro-4-(N'-benzenesulfonyl-N'-ω-aminohexyl)-amino benzene.

2 g. of hydrazine hydrate are added to a solution of 0.0193 mol (10.37 g.) of substituted phthalimide in 80 cm.³ of propanol. Then it is heated for 30 minutes in a boiling water-bath. The major portion of the resultant phthalhydrazine is eliminated by filtration of the hot reaction mixture.

After cooling, an orange oil is isolated by decantation and placed in solution in ethyl acetate. This solution of ethyl acetate is extracted using ½ N hydrochloric acid.

After the hydrochloric phase has been alkalized with sodium hydroxide, drying yields 3.5 g. of 1-N-methylamino-2-nitro-4-(N'-benzenesulfonyl-N'-ω - aminohexyl)-amino benzene which melts at 130° C.

The propanolic mother liquor, after saturation with dry hydrochloric acid, yields another 2 g. of the desired product, isolated in the form of the hydrochloride.

Fourth step: Preparation of the dihydrochloride of 1-N-methylamino-2-nitro-4-(N' - ω - aminohexyl)-amino benzene.

0.008 mol (3.2 g.) of 1 - N - methylamino - 2 - nitro-4-(N'-ω-aminohexyl)-amino benzene is heated in solution in 10 cm.³ of concentrated hydrochloric acid for 30 minutes in a boiling water-bath. After cooling and addition of 10 cm.³ of absolute alcohol, drying yields 2 g. of dihydrochloride of 1-N-methylamino-2-nitro-4-(N'-ω-aminohexyl)-amino benzene. After recrystallization in concentrated hydrochloric acid mixed with an equal volume of alcohol, analysis of the product yields the following results:

*Analysis.*—Calculated for $C_{13}H_{24}N_4O_2Cl_2$ (percent): C, 46.01; H, 7.08; N, 16.52. Found (percent): C, 46.30–46.23; H, 7.30–7.27; N, 16.51–16.50.

EXAMPLE 27

First process for preparation of 1-N-methylamino-2-nitro-4-N'-β-aminoethylamino benzene The reactions utilized to prepare this product may be schematically represented in the following manner:

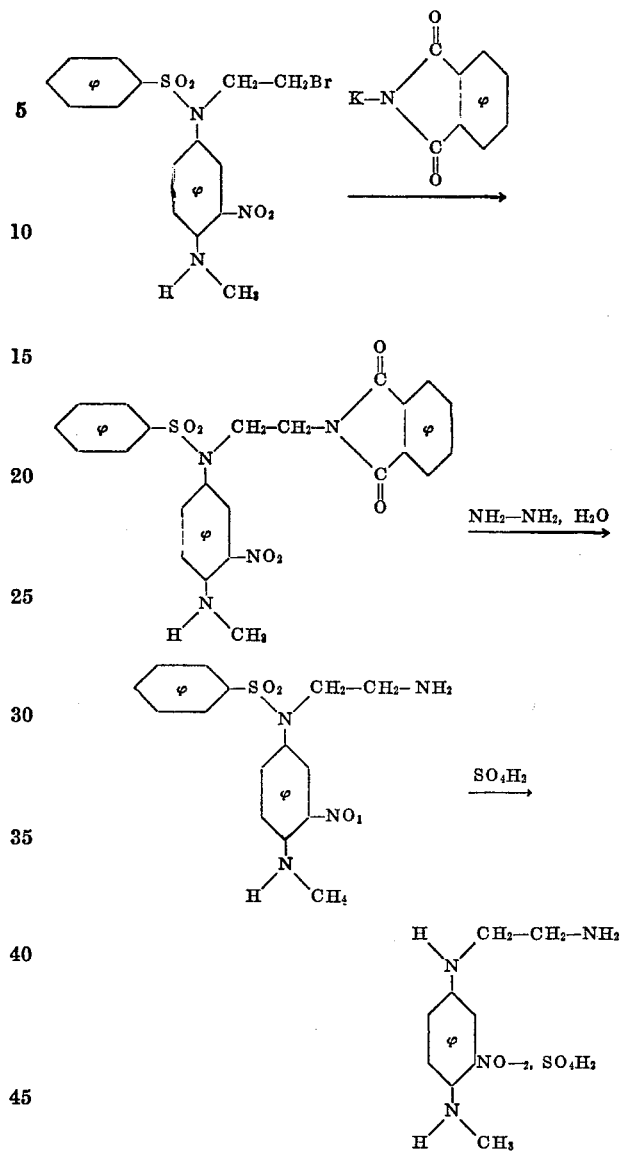

First step: Preparation of 1 - N - methylamino - 2-nitro - 4 - (N' - benzene - sulfonyl - N' - β-phthalimido-ethyl)-amino benzene.

Method (a): 0.122 mol (50.5 g.) of 1 - N - methylamino - 2 - nitro - 4 - (N' - benzenesulfonyl - N' - β-bromoethyl)-amino benzene is dissolved in 150 cm.³ of dimethylformamide. 0.162 mol (30 g.) of potassium phthalimide is added and the reaction mixture is heated for 1 hour in a boiling water-bath. It is then poured into 2 litres of water and drying yields 57.5 g. of 1-N-methyl-amino - 2 - nitro - 4 - (N' - benzenesulfonyl - N' - β-phthalimidoethyl)-amino benzene which, after recrystallization in toluene, melts at 218° C. The analysis of the product is:

*Analysis.*—Calculated for $C_{23}H_{20}O_6N_4S$ (percent): C, 57.53; H, 4.17; N, 11.66. Found (percent): C, 57.28–57.10; H, 3.98–4.20; N, 11.67–11.66.

Method (b): 0.05 mol (17.25 g.) of the potassium salt of 1 - N - methylamino - 2 - nitro - 4 - N' - benzenesulfonyl-amino benzene is dissolved in 50 cm.³ of dimethylformamide. 13.97 g. of β-bromoethylphthalimide is added and the mixture is heated for 1 hour at 140° C. After cooling, the reaction mixture is poured into a liter of water and drying yields a gummy product which, after three crystallizations in toluene, yields 12 g. of 1-N-methylamino - 2 - nitro - 4 - (N' - benzenesulfonyl - N' - β-phthalimidoethyl)-amino benzene, which melts at 218° C.

The yield is poorer than that obtained by the preceding method.

Second step: Preparation of 1 - N - methylamino - 2 - nitro - 4 - (N' - benzenesulfonyl - N' - β-aminoethyl)-amino benzene.

0.119 mol (57 g.) of 1 - N - methylamino - 2 - nitro - 4 - (N' - benzenesulfonyl - N' - β - phthalimidoethyl)-amino benzene is dissolved in 350 cm.³ of propanol. 0.238 mol (11.9 g.) of hydrazine hydrate is added to this solution and heated for an hour in a boiling water-bath. After cooling the reaction mixture at the ambient temperature, the resulting phthalhydrazide is eliminated by filtration.

The propanolic solution is then concentrated to about 80 cm.³. After chilling, 30 g. of the desired product are obtained in the form of an oil which crystallizes slowly. After recrystallization in a mixture of ethanol and water, the product melts at 110° C. Analysis yields the following results:

*Analysis.*—Calculated for $C_{15}H_{18}O_4N_4S$ (percent): C, 51.43; H, 5.14; N, 16.00. Found (percent): C, 51.41–51.37; H, 5.19–5.28; N, 16.01–16.02.

Third step: Preparation of 1 - N - methylamino - 2 - nitro-4-N'-β-aminoethylamino benzene.

0.0074 mol (2.6 g.) of 1 - N - methylamino - 2 - nitro - 4 - (N' - benzenesulfonyl - N' - β - aminoethyl)-amino benzene is dissolved at ordinary temperature in 15 cm.³ of sulfuric acid. The reaction mixture is left at 15° C. for 4 hours, and then poured into 150 cm.³ of ice water. It is rendered alkaline with sodium hydroxide. After a night in the refrigerator, drying yields 1.5 g. of 1-N-methylamino-2-nitro-4-N'-β-aminoethylamino benzene which, after recrystallization in a cyclohexane-benzene mixture, melts at 120° C. The analysis of the end product is:

*Analysis.*—Calculated for $C_9H_{14}O_2N_4$ (percent): C, 51.42; H, 6.66; N, 26.66. Found (percent): C, 51.13–51.22; H, 6.51–6.51; N, 26.81–26.59.

EXAMPLE 28

Second process for the preparation of 1-N-methylamino-2-nitro-4-N'-β-aminoethylamino benzene The reactions utilized to prepare this product may be schematically represented in the following manner:

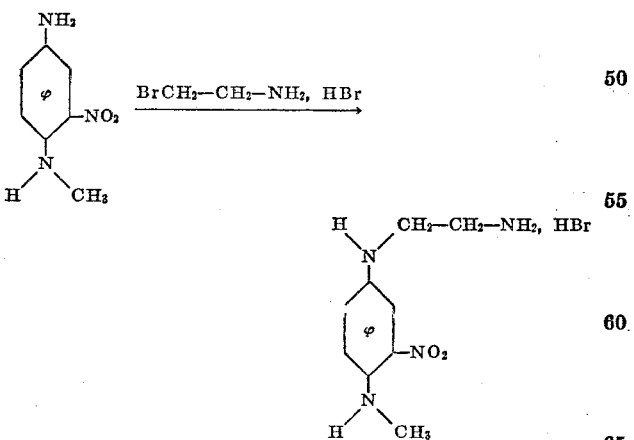

The mixture of 0.30 mol (50 g.) of 1-N-methylamino-2 - nitro - 4 - amino benzene, 250 cm.³ of water and 17 g. of calcium carbonate is brought to reflux. Little by little, under agitation, 0.330 mol (67.6 g.) of β-bromoethyl-amine hydrobromide in solution in 150 cm.³ of water is added. When the addition is finished, it is again heated to reflux for an hour and filtered hot. The filtrate is cooled to 0° C. and drying yields 60 g. of the desired product in the form of the monohydrobromide. This monohydrobromide is dissolved in a sufficient amount of water and the solution is extracted using methyl-isobutyl-ketone to eliminate a little of the initial product which has not reacted. The aqueous phase is rendered alkaline with sodium hydroxide and drying yields 40 g. of 1 - N - methylamino-2-nitro - 4 - N' - β - aminoethylamino benzene which melts at 120° C.

EXAMPLE 29

Preparation of the dihydrochloride of 1-N-β-(diethylamino)-ethylamino - 2 - nitro-4-N'-di-β-hydroxyethylamino benzene The reactions utilized to prepare this product may be schematically represented in the following manner:

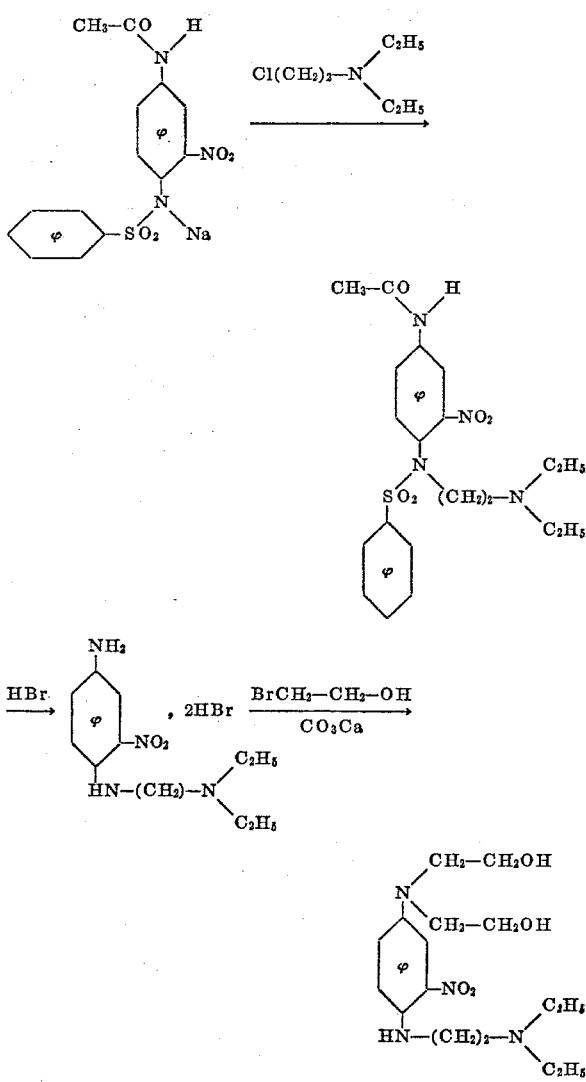

First step: Preparation of N-benzene-sulfonyl-1-N-β-(diethyl-amino)-ethylamino-2-nitro-4-acetamido benzene.

The sodium salt of 1-N-benzene-sulfonyl-amino-2-nitro-4-acetamido benzene is used as raw material. This salt may be prepared in the manner indicated in Luxembourg patent application No. 49,213 filed July 30, 1965. It should be noted, however, that in this Luxembourg patent it is indicated that the reaction may be carried out in water. It has since been found that the yield is much higher if dimethyl-formamide is used as the solvent, and dimethyl-formamide has accordingly been used in the first step of the present example, which will now be described. 0.2 mol (71.4 g.) of 1-N-benzene-sulfonyl-amino-2-nitro-4-acetamino benzene is dissolved in 280 cm.³ of dimethyl-formamide at 80° C. 0.2 mol (27.1 g.) of diethylamino-ethyl chloride is quickly added and the reaction mixture is heated for 20 minutes in a boiling water-bath. It is cooled, then poured into a liter of water and, on drying, yields 70 g. of a crude product which, after being treated with a 2 N sodium hydroxide solution to eliminate a little of the initial product, washing with water and recrystallization in alcohol, melts at 130° C.

Second step: Preparation of the dihydrobromide of 1-N-β-(diethylamino)-ethylamino-2-nitro-4-amino benzene.

0.217 mol of N-benzene-sulfonyl-1-N-β-(diethylamino)-ethylamino-2-nitro-4-acetamido benzene in 200 cm.³ of hydrobromic acid at a density $d=1.78$ is added to 150 cm.³ of water and heated for 4 hours in a boiling water-bath. After cooling, drying yields 72 g. of the dihydrobromide. The base obtained from this dihydrobromide melts at 65° C.

Third step: Preparation of dihydrochloride of 1-N-β-(diethylamino) - ethylamino - 2 - nitro-4-N'-di-β-hydroxyethylamino benzene.

0.05 mol (20.7 g.) of dihydrobromide of 1-N-β-(diethylamino)-ethylamino-2-nitro-4-amino benzene is heated for 2 hours in a boiling water-bath with 25 cm.³ of 99.5% glycol bromohydrin (0.2 mol) with 5 cm.³ of water and 10 g. of calcium carbonate.

200 cm.³ of water are added, the mixture is filtered and alkalized with sodium hydroxide and the sodium solution is extracted, using methyl-isobutyl-cetone. After the solvent has been driven off under vacuum, the oily residue is redissolved in 100 cm.³ of absolute alcohol and this alcohol solution is cooled and saturated with dry gaseous hydrochloric acid. Drying yields 17 g. of the dihydrochloride of 1-N-β-(diethylamino)-ethylamino-2-nitro-4-N'-di-β-hydroxyethylamino benzene which, after recrystallization in 20 cm.³ of absolute alcohol with 3 cm.³ of concentrated hydrochloric acid, melts with decomposition between 140 and 145° C. The analysis of the end product is:

*Analysis.*—Calculated for $C_{16}H_{30}N_4Cl_2O_4$ (percent): C, 46.48; H, 7.26; N, 13.55. Found (percent): C, 46.28–46.39; H, 7.21–7.27; N, 13.36–13.36.

EXAMPLE 29B

Preparation of 1-N-γ-(diethylamino)propylamino-2-nitro-4-N'-di-β-hydroxyethylamino benzene dihydrochloride The reactions utilized in the course of preparation may be schematically illustrated as follows:

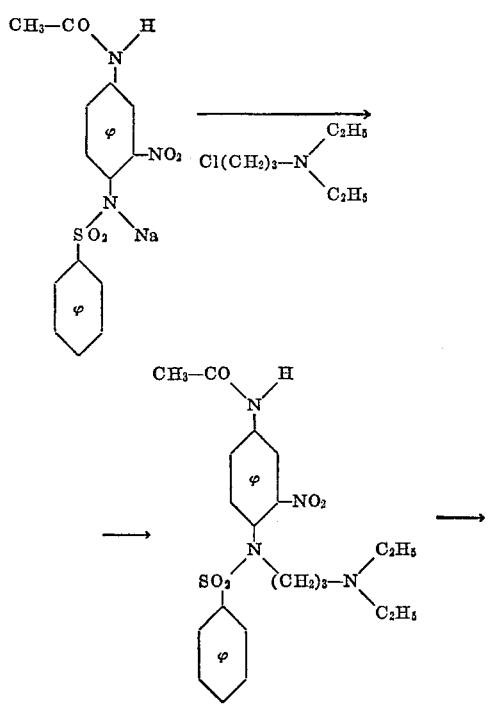

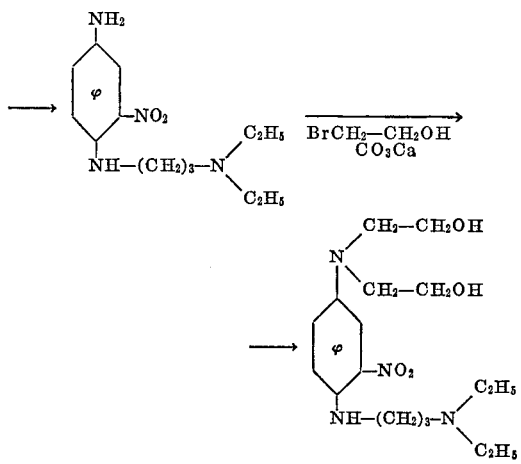

Glycol hydrobromide is condensed on 1-N-γ-(diethylamino)propylamino-2-nitro-4-amino benzene dihydrochloride in the presence of calcium carbonate. This dihydrochloride is obtained by condensing diethylaminopropylchloride in dimethyl-formamide on the sodium salt of 1-N-benzenesulfonyl-2-nitro-4-acetamido benzene, in the manner described in Luxembourg application Ser. No. 49,213 filed, July 30, 1965, and by said hydrolysis of the 1 - N - benzene-sulfonyl-N-γ-(diethylamino)propylamino-2-nitro-4-acetamido benzene thus obtained.

First step: Preparation of 1-N-benzenesulfonyl-N-γ-(diethylamino)-propylamino-2-nitro-4-acetamido benzene.

0.6 mol (215 g.) of the sodium salt of 1-N-benzenesulfonylamino-2-nitro-4-acetamido benzene is dissolved in 860 cm.³ of dimethylformamide at 80° C. 0.62 mol (93 g.) of diethylaminopropylchloride is added fairly rapidly and the reaction mixture heated for an hour in a boiling water-bath. It is then cooled and poured into 4 liters of ice water. Drying yields the crude product, which is treated with a normal sodium hydroxide solution to eliminate a little of the initial product, washed with water, dried, and recrystallized in methanol. The yield is 163 g. of the crystallized product, which melts at 98° C.

Second step: Preparation of 1-N-γ-(diethylamino)-propylamino-2-nitro-4-amino benzene dihydrochloride.

0.138 (61.6 g.) of the sulfonamide previously obtained is heated for four hours at 80° C. in 165 cm.³ of concentrated sulfuric acid. The reaction mixture is poured over ice, alkalized with a sodium hydroxide solution and the hydrolyzed product is extracted, using ethyl acetate. The ethyl acetate is driven off under vacuum and the oily residue dissolved in 100 cm.³ of methanol. This methanolic solution is saturated with dry gaseous hydrochloric acid and drying yields 38.2 g. of 1-N-γ-(diethylamino)-propylamino-2-nitro-4 amino benzene dihydrochloride, which melts and decomposes at 190° C.

Third step: Preparation of 1-N-γ-(diethylamino)-propylamino - 2 - nitro-4-N'-di-β-hydroxyethylamino benzene dihydrochloride.

0.1 mol (34 g.) of 1-N-γ-(diethylamino)-propylamino-2-nitro-4 amino benzene is heated for two hours in a boiling water-bath, with 50 g. (0.4 mol) of 99.5% glycol bromohydrin added to 10 cm.³ of water and 20 g. of calcium carbonate. 200 cm.³ of water is then added, and the solution filtered. After alkalization with sodium hydroxide, the solution is extracted with butyl-alcohol. The solvent is eliminated under vacuum and the oily residue dissolved in methanol. The methanolic solution is saturated with dry gaseous hydrochloric acid and drying yields 30.12 g. of the dihydrochloride, which melts and decomposes at 140° C.

*Analysis.*—Calculated for $C_{17}H_{32}N_4Cl_2O_4$ (percent): C, 44.77; H, 7.49; N, 13.11. Found (percent): C, 47.73–47.80; H, 7.38–7.59; N, 13.32–13.21.

EXAMPLE 30

The following solution is prepared:

Iodide of β-[N-methyl-N(3-nitro - 4 - N'-methylamino)-phenyl]aminoethyl methylpiperidinium—0.4 g.
Lauric alcohol oxyethylenated with 10.5 molecules of ethylene oxide—5 g.
Sodium carbonate, q.s.p.—pH 9
Water, q.s.p.—100 cm.³

This solution, applied to deep blond hair and left for fifteen minutes, yields, after rinsing and shampooing, a strong auburn.

EXAMPLE 31

The following solution is prepared:

Dihydrochloride of 1-N-methylamino-2-nitro-4-N'-methyl-N'-β - (methyl-hydroxyethylamino)ethylamino benzene—0.17 g.
1-N-γ-diethylaminopropyl)amino - 2 - amino - 4 - nitrobenzene—0.5 g.
Lauric alcohol oxyethylenated with 10.5 molecules of ethylene oxide—5 g.
Sodium carbonate, q.s.p.—pH 9
Water, q.s.p.—100 cm.³

This solution, applied for fifteen minutes to 100% white hair, yields, after rinsing and shampooing, a reddish-gold blond.

EXAMPLE 32

The following solution is prepared:

1-N-methylamino-2-nitro - 4 - N'-methyl-N'-β-piperidino-ethylamino benzene—0.01 g.
Lauric alcohol oxyethylenated with 10.6 molecules of ethylene oxide—5 g.
Monoethanolamine, q.s.p.—pH 9
Water, q.s.p.—100 cm.³

This solution, applied for five to ten minutes to hair bleached platinum, yields, after rinsing and shampooing, a rosewood shade.

EXAMPLE 33

The following solution is prepared:

Dihydrochloride of 1-N-methylamino-2-nitro-4-N'-methyl-N'-diethylamino-ethylamino-benzene—0.03 g.
1 - N - γ -(diethylaminopropyl)-amino-2-amino-4-nitro benzene—0.01 g.
Lauric alcohol oxyethylenated with 10.5 molecules of ethylene oxide—5 g.
Monoethanolamine, q.s.p.—pH 9
Water, q.s.p.—100 cm.³

This solution, applied for ten to fifteen minutes to hair previously bleached platinum, yields, after rinsing and shampooing, a light copper mahogany tint.

EXAMPLE 34

The following solution is prepared:

1 - N - β - piperidinoethylamino - 2 - nitro - 4-N'-methyl-amino-benzene—0.084 g.
1 - N - γ - (diethylaminopropyl)-amino-2-amino-4-nitrobenzene—0.035 g.
Lauric alcohol oxyethylenated with 10.5 molecules of ethylene oxide—5 g.
Water, q.s.p.—100 cm.³

This solution, applied to 100/ white hair for fifteen minutes, yields, after rinsing and shampooing, a reddish blond.

EXAMPLE 35

The following solution is prepared:

Dihydrochloride of 1-N-methylamino-2-nitro-4-[N'-β-hydroxyethyl - N' - β - diethylaminoethyl]aminobenzene—0.152 g.
4-nitro-1,3-phenylenediamine—0.030 g.
Lauric alcohol oxyethylenated with 10.5 molecules of ethylene oxide—5 g.
Sodium carbonate 2 N, q.s.p.—pH 9
Water, q.s.p.—100 cm.³

This solution applied to 100% white hair for fifteen minutes, yields, after rinsing and shampooing, a beige shade.

EXAMPLE 36

The following solution is prepared:

1 - N - β - piperidinoethylamino - 2 - nitro-4-aminobenzene—0.235 g.
Lauric alcohol oxyethylenated with 10.5 molecules of ethylene oxide—5 g.
Water, q.s.p.—100 cm.³

This solution applied to light chestnut hair for ten minutes, yields after rinsing and shampooing, a strong violine chestnut.

EXAMPLE 37

The following solution is prepared:

Dihydrochloride of 1-N-methylamino-2-nitro-4-N'-(β-diethylamino)-ethylamine-benzene—0.5 g.
1-N-methylamino-2-nitro-4-N'-β-piperidino-ethylamino benzene—0.2 g.
Lauric alcohol oxyethylenated with 10 molecules of ethylene oxide—5 g.
Monoethanolamine, q.s.p.—pH 9
Water, q.s.p.—100 cm.³

This solution, applied to light chestnut hair for ten to fifteen minutes, yields, after rinsing and shampooing a light chestnut with watery rose glints.

EXAMPLE 38

The following solution is prepared:

Iodide of β[N-methyl-N-(3-nitro-4-N'-methylamino) phenyl]aminoethyl-methylpiperidinium—0.4 g.
Dihydrochloride of 1-N-methylamino-2-nitro-4-N'-(β-diethylamino)-ethylamino benzene—0.2 g.
Dihydrochloride of 1-N-methylamino-2-nitro-4-N'-methyl-N'-β-(methyl-hydroxyethylamino)-ethylamino benzene—0.15 g.
Lauric alcohol oxyethylenated with 10.5 molecules of ethylene oxide—5 g.
2 N sodium carbonate, q.s.p.—pH 8.5
Water, q.s.p.—100 cm.³

This solution, applied to deep chestnut hair for twenty minutes, yields, after rising and shampooing, a deep violine chestnut.

EXAMPLE 39

The following solution is prepared:

1-N-β-piperidinoethylamino-2-nitro-4-amino benzene—0.5 g.
Dihydrochloride of 1-N-methylamino-2-nitro-4-[N'-β-diethylaminoethyl-N'-β-hydroxyethyl]amino benzene—0.1 g.
1-N-β-piperidinoethylamino-2-nitro-4-N'-methylamino-benzene—0.1 g.
Lauric alcohol oxyethylenated with 10.5 molecules of ethylene oxide—5 g.
Sodium carbonate 2 N q.s.p.—pH 7.5
Water, q.s.p.—100 cm.³

This solution, applied to deep chestnut hair for twenty to twenty-five minutes, yields, after rinsing and shampooing, a deep chestnut with violet glints.

EXAMPLE 40

The following solution is prepared:

Dihydrochloride of 1-N-methylamino-2-nitro-4-(N'-methyl-N'-O-aminoethyl)-amino benzene—0.03 g.
4-nitro-1,3-phenylenediamine—0.05 g.

Lauric alcohol oxyethylenated with 10.5 molecules of
  ethylene oxide—7 g.
Sodium carbonate, q.s.p.—pH 7
Water, q.s.p.—100 cm.$^3$ This solution, applied to 100% white hair for fifteen minutes, yields, after rinsing and shampooing, a beige tint.

EXAMPLE 41

The following solution is prepared:

1-N-$\beta$-(methyl-hydroxyethyl)-aminoethylamino-2-nitro-4-
  N'-methylamino benzene—0.14 g.
N-$\gamma$-(diethylaminopropyl)-amino-2-amino-4-nitro benzene—0.05 g.
Lauric alcohol oxyethylenated with 10 molecules of
  ethylene oxide—5 g.
Sodium carbonate, q.s.p.—pH 9
Water, q.s.p.—100 cm.$^3$ This solution applied to 100% white hair for fifteen minutes yields, after rinsing and shampooing, a reddish blond.

EXAMPLE 42

The following solution is prepared:

Iodide of $\beta$[N-(2-nitro-4-N'-methylamino)-phenyl]-
  aminoethyl-methylpiperidinium—0.21 g.
1-N-$\gamma$-(diethylaminopropyl)-amino-2-amino-4-nitro-
  benzene—0.05 g.
Lauric alcohol oxyethylenated with 10.5 molecules of
  ethylene oxide—5 g.
Monoethanolamine, q.s.p.—pH 7
Water, q.s.p.—100 cm.$^3$ This solution, applied to 100% white hair for fifteen minutes, yields, after rinsing and shampooing, a light copper mahogany.

EXAMPLE 43

The following solution is prepared:

Iodide of $\beta$[N-(2-nitro-4-amino)-phenyl]-aminoethyl-
  methylpiperidinium—0.28 g.
Lauric alcohol oxyethylenated with 10.5 molecules of
  ethylene oxide—2 g.
Sodium carbonate, q.p.s.—pH 9
Water, q.s.p.—100 cm.$^3$ This solution, applied to light chestnut hair for ten minutes, yields, after rinsing and shampooing, a strong auburn.

EXAMPLE 44

The following solution is prepared:

Dihydrochloride of 1-N-methylamino-2-nitro-4-(N'-
  methyl-N'-$\beta$-aminoethyl)-amino benzene—0.09 g.
1-N-($\beta$-(methyl-hydroxyethyl)-aminoethylamino-2-nitro-
  4-N'-methylamino benzene—0.08 g.
Iodide of $\beta$[N$_6$(2-nitro-4-N'-methylamino)-phenyl]-
  aminoethyl-methylpiperidinium—0.13 g.
Lauric alcohol oxyethylenated with 10.5 molecules of
  ethylene oxide—2 g.
Monnoethanolamine, q.p.s.—pH 9
Water, q.s.p.—100 cm.$^3$ This solution applied to light chestnut hair for ten minutes, yields, after rinsing and shampooing, a deep violine mahogany.

EXAMPLE 45

The following solution is prepared:

Dihydrochloride of 1-N-$\beta$-aminoethylamino-2-nitro-4-N'-
  bis-$\beta$-hydroxyethylamino benzene—0.36 g.
Lauric alcohol oxyethylenated with 10.5 molecules of
  ethylene oxide—5 g.
Sodium carbonate, q.s.p.—pH 7
Water, q.s.p.—100 cm.$^3$ This solution, applied to 100% white hair for fifteen minutes, yields, after rinsing and shampooing, a violet blue.

EXAMPLE 46

The following tinctorial composition is prepared:

[1-N-methylamino-2-nitro-4-N'-$\beta$-aminoethylamino-
  benzene]-monohydrobromide—0.73 g.
Lauric alcohol oxyethylenated with 10.5 moles of ethylene
  oxide—5 g.
Na$_2$CO$_3$ in 2 N solution, q.s.p.—pH 8
Water, q.s.p.—100 g.

This composition is applied to natural light chestnut hair and left for ten minutes, followed by rinsing and shampooing.

The result is a deep violine hue.

EXAMPLE 47

The following tinctorial composition is prepared:

[1-N-$\beta$-hydroxy-ethylamino-2-nitro-4-N'-$\beta$-diethylamino-
  benzene]-dihydrochloride—0.296 g.
1-N-$\beta$-aminoethylamino-2-nitro-4-methyl-5-amino-
  benzene—0.042 g.
Lauric alcohol oxyethylenated with 10.5 mols of ethylene
  oxide—2 g.
Na$_2$CO$_3$ in twice normal solution, q.s.p.—pH 9
Water, q.s.p.—100 g.

This composition is applied to natural 100% white hair and left for ten minutes, followed by rinsing and shampooing.

The result is a reddish blond.

EXAMPLE 48

The following tinctorial composition is prepared:

[1-$\beta$-hydroxyethylamino-2-nitro-4-(N'-methyl-N'-$\beta$-
  diethylaminoethyl)amino-benzene]-dihydrochloride— 0.304 g.
1-$\beta$-aminoethylamino-2-nitro-4-methyl-5-amino-
  benzene—0.042 g.
Lauric alcohol oxyethylenated with 10.5 mols of
  ethylene oxide—2 g.
Na$_2$CO$_3$ in twice normal solution, q.s.p.—pH 7
Water, q.s.p.—100 g.

This composition is applied to rigorously bleached hair and left for ten minutes followed by rinsing and shampooing. The result is a deep copper mahogany.

EXAMPLE 49

The following tinctorial composition is prepared:

[1-N-methylamino-2-nitro-4-(N'-$\omega$-aminobutyl)-amino-
  benzene]-dihydrochloride—0.233 g.
1-$\beta$-aminoethylamino-2-nitro-4-methyl-5-amino
  benzene—0.052 g.
Lauric alcohol oxyethylenated with 10.5 mols of ethylene
  oxide—2 g.
Na$_2$CO$_3$ in twice normal solution, q.s.p.—pH 9
Water, q.s.p.—100 g.

This composition is applied to natural 100% white hair and left for ten minutes, followed by rinsing and shampooing. The result is a deep pearly blond.

EXAMPLE 50

The following tinctorial composition is prepared:

[1-N-$\beta$-aminoethylamino-2-nitro-4-amino-benzene]-
  dihydrochloride—1.2 g.
Lauric alcohol oxyethylenated with 10.5 mols of ethylene
  oxide—2 g.
Na$_2$CO$_3$ in twice normal solution, q.s.p.—pH 8
Water, q.s.p.—100 g.

This composition is applied to natural 100% white hair and left for ten minutes, followed by rinsing and shampooing. The result is a deep red with purple overtones.

EXAMPLE 51

The following tinctorial composition is prepared:

[1-N-methylamino-2-nitro-4-ω-aminohexylamino-
benzene]-dihydrochloride—1.5 g.
Lauric alcohol oxyethylenated with 10.5 mols of ethylene
oxide—5.0 g.
Na₂CO₃ in twice normal solution, q.s.p.—pH 8
Water, q.s.p.—100 g.

This composition is applied to natural 100% white hair and left for ten minutes, followed by rinsing and shampooing. The result is a very strong violet shade.

EXAMPLE 52

The following tinctorial solution is prepared:

[1-N-methylamino-2-nitro-4-N'-γ-(methyl-β-hydroxy-
ethyl)-aminopropylamino-benzene]-dihydrochlo-
ride—0.50 g.
Lauric alcohol oxyethylenated with 10.5 mols of ethylene
oxide—5.00 g.
Na₂CO₃ in twice normal solution, q.s.p.—pH 9
Water, q.s.p.—100 g.

This composition is applied to light chestnut hair and left for twenty minutes, followed by rinsing and shampooing. The result is a deep violine hue.

EXAMPLE 53

The following tinctorial composition is prepared:

Dihydrochloride of 1-N-β-(diethylamino)-ethylamino-2-
nitro-4-N'-di-β-hydroxyethylamino-benzene—0.41 g.
Lauric alcohol oxyethylenated with 10.5 mols of ethylene
oxide—5 g.
Na₂CO₃ is twice normal solution, q.s.p.—pH 7
Water, q.s.p.—100 g.

This composition is applied to deep golden blond hair and left for ten minutes, followed by rinsing and shampooing. The result is a chestnut with pearly glints.

EXAMPLE 54

The following tinctorial composition is prepared:

Dihydrochloride of 1-N-β-(diethylamino)-ethylamino-2-
nitro-4-N-di-β-hydroxyethylamino-benzene—0.369 g.
1-N-β-aminoethylamino-2-nitro-4-methyl - 5 - amino-benzene—0.021 g.
Lauric alcohol oxyethylenated with 10.5 mols of ethylene
oxide—4.5 g.
Na₂CO₃ in twice normal solution, q.s.p.—pH 9
Water, q.s.p.—100 g.

This composition is applied to 90% white hair and left for ten minutes, followed by rinsing and shampooing. The result is a light golden bond.

EXAMPLE 55

The following tinctorial composition is prepared:

1-N-γ-(diethylamino)-propylamino - 2 - nitro-4-N'-di-β-
hydroxyethylaminobenzene dihydrochloride—0.43 g.
Lauric alcohol oxyethylenated with 10.5 mols of ethylene
oxide—1.5 g.
2 N solution of Na₂CO₃, q.s.p.—pH 9.
Water, q.s.p.—100 g.

This solution is applied to 90% white hair. It is left for fifteen minutes. The hair is then rinsed and shampooed. A strong violet gray results.

EXAMPLE 56

The following tinctorial composition is prepared:

4-nitro-3-β-aminoethylamino - N,N' - dimethylaniline—
0.02 g.

1-N-γ-(diethylamino)-propylamino - 2 - nitro-4-N'-di-β-
hydroxyethylamino benzene dihydrochloride—0.38 g.
Lauric alcohol oxyethylenated with 10.5 mols of ethylene
oxide—1 g.
2 N solution of Na₂CO₃, q.s.p.—pH 8.5
Water, q.s.p.—100 g.

This composition is applied to 90% white hair. It is left to act for ten minutes. The hair is then rinsed and shampooed. An ash blond shade results.

It will of course be appreciated that the foregoing examples have been given purely by way of illustration and may be modified as to detail without thereby departing from the basic principles of the invention.

What is claimed is:
1. A hair dye composition comprising an aqueous solution having a pH of about 4–10 of a dye having the formula

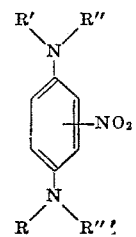

and its dihydrochloride salts, wherein R, R' and R" are selected from the group consisting of hydrogen, lower alkyl and lower hydroxyalkyl and R''' is

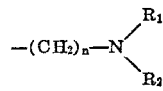

and the quaternary ammonium salts thereof wherein $R_1$ and $R_2$ are selected from the group consisting of hydrogen, lower alkyl and lower hydroxylalkyl and $R_1$ and $R_2$ together with the nitrogen atom to which they are attached form a heterocyclic ring and $n$ is an integer of 2–6, the amino group in the ortho position relative to the nitro group being other than tertiary, and only one of R' and R" is hydrogen when the nitro group is in the meta position relative to R'''.

2. The composition of claim 1 wherein said dye is present in amounts of about 0.1–3.5 weight percent of said composition.

3. The composition of claim 1 wherein the pH ranges between 6–10.

4. The composition of claim 1 wherein said dye is 1-N-methylamino - 2 - nitro-4-N'-(β-diethylamino)ethyl-aminobenzene.

5. The composition of claim 1 wherein said dye is 1-N-methylamino-2-nitro - 4 - N'-β-(methyl-hydroxyethyl)amino-ethylamino benzene.

6. The composition of claim 1 wherein said dye is 1-methylamino - 2 - nitro-4-(N'-β-hydroxyethyl-N'-β-diethylaminoethyl)amino benzene.

7. The composition of claim 1 wherein said dye is 1 - methylamino-2-nitro-4-(N'-methyl-N'-β-aminoethyl)-aminobenzene.

8. The composition of claim 1 wherein said dye is 1 - methylamino-2-nitro-4-(N'-methyl-N'-β-diethylaminoethyl) amino benzene dihydrochloride.

9. A process for dyeing human hair comprising applying to said hair a coloring amount of a hair dye composition comprising an aqueous solution having a pH of about 4–10 of a dye having the formula

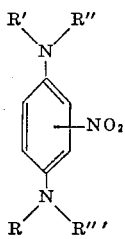

and its dihydrochloride salts, wherein R, R' and R" are selected from the group consisting of hydrogen, lower alkyl and lower hydroxy alkyl and R''' is

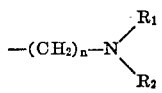

and the quaternary ammonium salts thereof wherein $R_1$ and $R_2$ are selected from the group consisting of hydrogen lower alkyl and lower hydroxyalkyl and $R_1$ and $R_2$ together with the nitrogen atom to which they are attached form a heterocyclic ring and $n$ is an integer of 2–6 inclusive, the amino group in the ortho position relative to the nitro group being other than tertiary, and only one of R' and R" is hydrogen when the nitro group is in the meta position relative to R''', said dye being present in amounts of about 0.1–3.5 weight percent of said composition, leaving said composition on said hair for 5–30 minutes and then rinsing, shampooing and drying said hair.

References Cited

UNITED STATES PATENTS

| | | | |
|---|---|---|---|
| 3,629,330 | 12/1971 | Brody et al. | 8—10.2 X |
| 1,932,901 | 10/1931 | Lehmann | 8—11 |
| 2,750,326 | 6/1956 | Eckardt | 8—10.1 |
| 2,750,327 | 6/1956 | Eckardt | 8—10.1 |
| 3,088,878 | 5/1963 | Brunner | 8—10.1 |
| 3,168,442 | 2/1965 | Brunner | 8—10.1 |
| 3,274,249 | 9/1966 | Brunner | 260—573 |
| 3,049,393 | 8/1962 | Seemuller | 8—10 |
| 3,236,891 | 2/1966 | Seemuller | 8—10 X |

GEORGE F. LESMES, Primary Examiner

T. J. HERBERT, JR., Assistant Examiner

U.S. Cl. X.R.

8—10.1; 260—573, 574

UNITED STATES PATENT OFFICE
CERTIFICATE OF CORRECTION

Patent No. 3,726,635          Dated April 10, 1973

Inventor(s) Gregoire Kalopissis and Andree Bugaut

It is certified that error appears in the above-identified patent and that said Letters Patent are hereby corrected as shown below:

In The Heading, please insert --

Claims priority, applications Luxembourg July 30, 1965, No. 49,214; January 27, 1966, No. 50,348; and July 4, 1966, No. 51,474.--

Signed and sealed this 20th day of November 1973.

(SEAL)
Attest:

EDWARD M. FLETCHER, JR.
Attesting Officer

RENE D. TEGTMEYER
Acting Commissioner of Patents